United States Patent
Hwang et al.

[11] Patent Number: 5,914,803
[45] Date of Patent: Jun. 22, 1999

[54] THIN FILM ACTUATED MIRROR ARRAY IN AN OPTICAL PROJECTION SYSTEM AND METHOD FOR MANUFACTURING THE SAME

[75] Inventors: Kyu-Ho Hwang; Yoon-Joon Choi, both of Seoul, Rep. of Korea

[73] Assignee: Daewoo Electronics Co., Ltd., Seoul, Rep. of Korea

[21] Appl. No.: 08/886,395

[22] Filed: Jul. 1, 1997

[51] Int. Cl.⁶ .......................... G02B 26/08; G02B 7/182; H01L 41/053
[52] U.S. Cl. .................. 359/291; 359/224; 359/295; 359/318; 359/855; 430/321
[58] Field of Search .................. 359/212, 224, 359/290, 291, 295, 318, 850, 855; 430/321

[56] References Cited

U.S. PATENT DOCUMENTS

| | | | |
|---|---|---|---|
| 5,126,836 | 6/1992 | Um | 358/60 |
| 5,469,302 | 11/1995 | Lim | 359/846 |
| 5,754,331 | 5/1998 | Min | 359/291 |
| 5,760,947 | 6/1998 | Kim et al. | 359/291 |

Primary Examiner—Georgia Epps
Assistant Examiner—Margaret Burke
Attorney, Agent, or Firm—Pillsbury Madison & Sutro LLP

[57] ABSTRACT

Thin film AMA in an optical projection system and a method for manufacturing the same are disclosed. The thin film AMA has a substrate having an electrical wiring and a connecting terminal, an actuator formed on the substrate, and a supporting element for supporting the actuator and for preventing an initial deflection of the actuator. The actuator has a bottom electrode, an active layer, a top electrode. The supporting element has a supporting layer attached beneath the bottom electrode for supporting the actuator, a supporting member for supporting the actuator, the supporting member being formed between the substrate where the connecting terminal is formed and a bottom of a first portion of the supporting layer, and a secondary supporting member for preventing an initial deflection of the actuator, the secondary supporting member being formed between the substrate and a bottom of a second portion of the supporting layer. According to the present invention, the initial deflection of the actuator can be made uniform and a contrast of a picture projected onto a screen can be increased by reinforcing the secondary supporting member between the substrate and the supporting layer so as to reduce uneven residual stresses and stress gradients of an actuator.

16 Claims, 27 Drawing Sheets

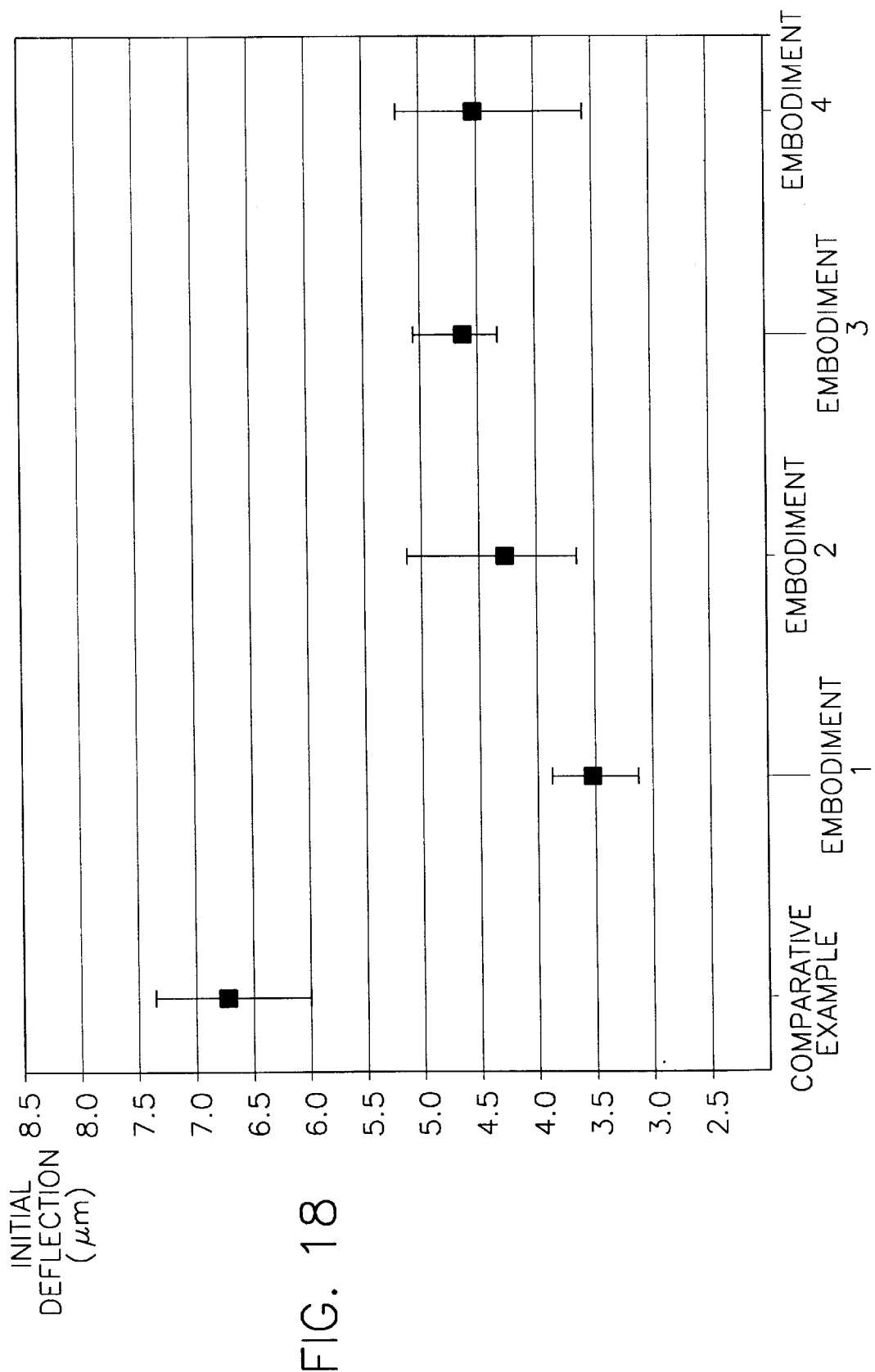

THIN FILM ACTUATED MIRROR ARRAY IN AN OPTICAL PROJECTION SYSTEM AND METHOD FOR MANUFACTURING THE SAME

BACKGROUND OF THE INVENTION

The present invention relates to a thin film actuated mirror array in an optical projection system and to a method for manufacturing the same, and more particularly to a thin film actuated mirror array in an optical projection system having a secondary supporting member between a substrate and a supporting layer so as to make an initial deflection of the actuator uniform, thereby increasing a contrast of a picture projected onto a screen, and to a method for manufacturing the same.

In general, light modulators are divided into two groups according to their optics. One type is a direct light modulator such as a cathode ray tube (CRT). The other type is a transmissive light modulator such as a liquid crystal display (LCD). The CRT produce superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2% due to light polarization. Also, there are some problems in the liquid crystal materials of the LCD such as sluggish response and overheating.

Thus, a digital mirror device (DMD) and actuated mirror arrays (AMA) have been developed in order to solve these problems. Currently, the DMD has a light efficiency of about 5%, but the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

FIG. 1 shows a schematic diagram of an engine system of a conventional AMA which is disclosed in U.S. Pat. No. 5,126,836 (issued to Gregory Um). Referring to FIG. 1, a ray of incident light from a light source 1 passes a first slit 3 and a first lens 5 and is divided into red, green, and blue lights according to the Red-Green-Blue (R-G-B) system of color representation. After the divided red, green, and blue lights are respectively reflected by a first mirror 7, a second mirror 9, and a third mirror 11, the reflected light is respectively incident on AMA devices 13, 15, and 17 corresponding to the mirrors 7, 9, and 11. The AMA devices 13, 15, and 17 tilt mirrors installed therein, so the incident light is reflected by the mirrors 7, 9, and 11. In this case, the mirrors 7, 9, and 11 installed in the AMA devices 13, 15, and 17 are tilted according to the deformation of active layers formed under mirrors. The lights reflected by the AMA devices 13, 15, and 17 pass a second lens 19 and a second slit 21 and form a picture on a screen (not shown) by using projection lens 23.

The AMA is generally divided into a bulk type AMA and a thin film type AMA. The bulk type AMA is disclosed in U.S. Pat. No. 5,469,302 (issued to Dae-Young Lim). In the bulk type AMA, after a ceramic wafer which is composed of multilayer ceramics inserted into metal electrodes therein is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film AMA manufactured by using semiconductor technology has been developed.

The thin film AMA is disclosed in U.S. Ser. No. 08/336,021, entitled "Thin Film Actuated Mirror Array Used in an Optical Projection System and Method for the Manufacture Thereof," which is now pending in USPTO and is subject to an obligation to the assignee of this application.

FIG. 2 shows a cross-sectional view of the thin film AMA. Referring to FIG. 2, the thin film AMA has an active matrix 31, an actuator 33 formed on the active matrix 31, and a mirror 35 installed on the actuator 33. The active matrix 31 has a substrate 37, M×N (in which M, N is integers) number of transistors (not shown) which are installed in the substrate 37, and M×N (in which M, N is integers) number of connecting terminals 39 respectively formed on the transistors.

The actuator 33 has a supporting member 41 formed on the active matrix 31 which includes connecting terminal 39, a first electrode 43 having a bottom of first portion thereof attached to the supporting member 41 and having a second portion formed parallel to the active matrix 31, a conduit 49 formed in the supporting member 41 so as to connect connecting terminal 39 to the first electrode 43, an active layer 45 formed on the first electrode 43, a second electrode 47 formed on the active layer 45, a spacing member 51 formed at first portion of the second electrode 47, and a supporting layer 53 having a bottom of first portion thereof attached to the spacing member 51 and having a second portion formed parallel to the second electrode 47. The mirror 35 is installed on the supporting layer 53.

A manufacturing method of the thin film AMA will be described below. FIGS. 3A to 3D illustrate manufacturing steps of the thin film AMA. In FIGS. 3A to 3D, the same reference numerals are used for the same elements in FIG. 2.

Referring to FIG. 3A, at first, the active matrix 31 which includes the substrate 37 in which M×N number of transistors (not shown) are formed and M×N number of connecting terminals 39 respectively formed on the transistors is provided. Subsequently, after a first sacrificial layer 55 is formed on the active matrix 31, the first sacrificial layer 55 is patterned to expose a portion of the active matrix 31 where the connecting terminal 39 is formed. The first sacrificial layer 55 can be removed by using an etching method or by means of chemicals.

Referring to FIG. 3B, the supporting member 41 is formed on the exposed portion of the active matrix 31 by a sputtering method or a chemical vapor deposition (CVD) method. Next, after a hole is formed through supporting member 41, the conduit 49 is formed in the supporting member 41 by filling the hole with an electrically conductive material, for example tungsten (W). The conduit 49 electrically connects the connecting terminal 49 to the first electrode 43 which is successively formed. The first electrode 43 is formed on the supporting member 41 and on the first sacrificial layer 55 by using an electrically conductive material such as gold (Au) or silver (Ag). The active layer 45 is formed on the first electrode 43 by using a piezoelectric material, for example lead zirconate titanate (PZT). The second electrode 47 is formed on the active layer 45 by using an electrically conductive material such as gold (Au) or silver (Ag).

The transistor installed in the active matrix 31 converts a picture signal which is caused by an incident light from a light source into a signal current. The signal current is applied to the first electrode 43 through the connecting terminal 39 and the conduit 49. At the same time, a bias current from a common line (not shown) formed on the bottom of the active matrix 31 is applied to the second electrode 47, so an electric field is generated between the second electrode 47 and the first electrode 43. The active layer 45 formed between the second electrode 47 and the first electrode 43 is actuated according to the electric field.

Referring to FIG. 3C, after a second sacrificial layer 57 is formed on the second electrode 47, the second sacrificial layer 57 is patterned to expose a portion of the second electrode 47 adjacent to a portion under which the supporting member 41 is formed. After the spacing member 51 is formed at the exposed portion, the supporting layer 53 is formed on the second sacrificial layer 57 and on the spacing member 51. Also, the mirror 35 for reflecting the incident light is formed on the supporting layer 53.

Referring to FIG. 3D, the mirror 35, the supporting layer 53, the second electrode 47, the active layer 45 and the first electrode 43 are sequentially patterned so that M×N number of pixels having predetermined shapes are formed. Consequently, after the first sacrificial layer 55 and the second sacrificial layer 57 are removed, pixels are rinsed and dried in order to complete the thin film AMA.

However, in the above-described thin film AMA, due to the thickness variations within a processed wafer and due to the uneven residual stresses and stress gradients of the thin film composites within a single pixel, a substantial amount of initial deflection of the actuator right after the release of the sacrificial layer exists. Since the initial deflection of an actuator directly affects the brightness of the corresponding image pixel, the uniformity of the initial tilting among the actuators is required. The deflection of the thin film AMA can be induced by two kinds of bending moments. One is present at the step-up boundary formed along the width-wise (W) of the actuator, and the other is distributed along the length-wise (L) of the actuator. The boundary bending moment is primarily dependent on the average residual stress and stress gradient, while the length-wise bending moment is mainly dependent on the stress gradient but have no dependence on the average residual stress. That is, the step-up region deflection by the boundary bending moment is dominant over the length-wise deflection by the length-wise bending moment.

The step-up boundary bending moment is responsible for 70–80% of the total deflection.

Due to the step-up boundary bending moment, the contrast of the picture projected onto a screen is decreased.

Knowing that the residual stress at the step-up region is the dominant factor for the initial deflection, there are two ways of controlling the initial deflection. One is to control the residual stress which is the result of the PZT shrinkage at the step-up region and the other is to reinforce the structure less sensitive to the pixel-to-pixel residual stress deviations and to the stress gradients. The process parameter variations within a wafer, which are common in semiconductor fabrication processes, make it difficult to achieve the acceptable uniformity of the dimensions and the residual stress variation below ±5%. Therefore, even the best control of the process results in inevitable pixel-to-pixel non-uniformity within a wafer. The improvement in structural design should be accomplished together with the best effort of process parameter control to achieve uniform and minimum initial deflections.

SUMMARY OF THE INVENTION

Accordingly, considering the problems as described above, it is a first object of the present invention to provide a thin film actuated mirror array in an optical projection system having a secondary supporting member between a substrate and a supporting layer so as to reduce uneven residual stresses and stress gradients of an actuator, thereby making an initial deflection of the actuator uniform and increasing a contrast of a picture projected onto a screen.

Also, it is a second object of the present invention to provide a method for manufacturing the above thin film actuated mirror array in an optical projection system.

To accomplish the above first object, there is provided in the present invention a thin film actuated mirror array in an optical projection system actuated by a first signal and a second signal. The thin film actuated mirror array in an optical projection system has a substrate, an actuator formed on the substrate, and a supporting element formed between the substrate and the actuator. The substrate has electrical wiring and a connecting terminal for receiving the first signal from outside and transmitting the first signal.

The actuator has a bottom electrode for receiving the first signal, a top electrode corresponding to the bottom electrode for receiving the second signal and generating an electric field between the top electrode and the bottom electrode, and an active layer formed between the top electrode and the bottom electrode and deformed by the electric field.

The supporting element has a supporting layer attached beneath the bottom electrode for supporting the actuator, a supporting member for supporting the actuator, and a secondary supporting member for preventing an initial deflection of the actuator. The supporting member is formed between the substrate where the connecting terminal is formed and a bottom of a first portion of the supporting layer. The secondary supporting member is formed between the substrate and a bottom of a second portion of the supporting layer.

The supporting layer, the supporting member and the secondary supporting member are formed by using the same material. The secondary supporting member is integrally formed with the supporting member on a lateral portion of the first portion of the supporting member. The cross-sectional area of the supporting member is broader than the cross-sectional area of the secondary supporting member. The supporting member has a first rectangular cross section and the secondary supporting member has a second rectangular cross section which is smaller than the first rectangular cross section. The ratio of widths of the first rectangular cross section and the second rectangular cross section is preferably between about 8:1 and about 4:1. The ratio of lengths of the first rectangular cross section and the second rectangular cross section is between about 2:1 and about 1:1.

Two secondary supporting members may be integrally formed with the supporting member. The two secondary supporting members are parallely formed on a lateral portion of the first portion of the supporting member. The secondary supporting member is formed apart from the supporting member. The cross-sectional area of the supporting member is broader than the cross-sectional area of the secondary supporting member. The supporting member has a first rectangular cross section and the secondary supporting member has a second rectangular cross section which is smaller than the first rectangular cross section.

The ratio of widths of the first rectangular cross section and the second rectangular cross section is between about 8:1 and about 4:1. The ratio of lengths of the first rectangular cross section and the second rectangular cross section is between about 5:1 and about 2:1.

Two secondary supporting members may be formed apart from the supporting member. The two supporting members are parallely formed each other.

Further, a reflecting member is formed on the top electrode.

The above first object may be achieved by providing a thin film actuated mirror array in an optical projection system actuated by a first signal and a second signal. The thin film actuated mirror array in an optical projection system has a substrate, an actuator formed on the substrate, and a supporting element formed between the substrate and the actuator. The substrate has electrical wiring and a connecting terminal for receiving the first signal from outside and transmitting the first signal.

The actuator has a bottom electrode for receiving the first signal, a top electrode corresponding to the bottom electrode for receiving the second signal and generating an electric field between the top electrode and the bottom electrode, and an active layer formed between the top electrode and the bottom electrode and deformed by the electric field.

The supporting element has a supporting layer attached beneath the bottom electrode for supporting the actuator, a supporting member for supporting the actuator, and a secondary supporting member formed between the substrate and a bottom of a second portion of the supporting layer for preventing an initial deflection of the actuator. The supporting member is formed between the substrate where the connecting terminal is formed and a bottom of a first portion of the supporting layer. The secondary supporting member is integrally formed with the supporting member.

The supporting member has a first rectangular cross section and the secondary supporting member has a second rectangular cross section which is smaller than the first rectangular cross section. The ratio of widths of the first rectangular cross section and the second rectangular cross section is about 8:1. The ratio of lengths of the first rectangular cross section and the second rectangular cross section is about 1:1.

Also, the above first object may be accomplished by providing a thin film actuated mirror array actuated by a first signal and a second signal. The thin film actuated mirror array in an optical projection system has a substrate, an actuator formed on the substrate, and a supporting element formed between the substrate and the actuator. The substrate has electrical wiring and a connecting terminal for receiving the first signal from outside and transmitting the first signal.

The actuator has a bottom electrode for receiving the first signal, a top electrode corresponding to the bottom electrode for receiving the second signal and generating an electric field between the top electrode and the bottom electrode, and an active layer formed between the top electrode and the bottom electrode and deformed by the electric field.

The supporting element has a supporting layer attached beneath the bottom electrode for supporting the actuator, a supporting member for supporting the actuator, and a secondary supporting member formed between the substrate and a bottom of a second portion of the supporting layer for preventing an initial deflection of the actuator. The supporting member is formed between the substrate where the connecting terminal is formed and a bottom of a first portion of the supporting layer. The secondary supporting member is formed apart from the supporting member.

The supporting member has a first rectangular cross section and the secondary supporting member has a second rectangular cross section which is smaller than the first rectangular cross section.

The ratio of widths of the first rectangular cross section and the second rectangular cross section is between about 8:1 and about 16:3. The ratio of lengths of the first rectangular cross section and the second rectangular cross section is between about 10:3 and about 2:1.

In order to accomplish the above second object, there is provided in the present invention a method for manufacturing a thin film actuated mirror array in an optical projection system actuated by a first signal and a second signal. The method for manufacturing the thin film actuated mirror array in an optical projection system comprises the steps of:

providing a substrate having electrical wiring and a connecting terminal for receiving the first signal from outside and transmitting the first signal;

forming a sacrificial layer on the substrate;

patterning the sacrificial layer as a rectangle shape so as to expose a first portion of the substrate where the connecting terminal is formed and patterning the sacrificial layer as a rectangle shape so as to expose a second portion of the substrate adjacent to the first portion, the second portion being smaller than the first portion;

forming a supporting member and a secondary supporting member on the exposed portion of the substrate;

forming a first layer on the supporting member, on the secondary supporting member and on the sacrificial layer;

forming a bottom electrode layer, a second layer and a top electrode layer on the first layer;

forming an actuator by patterning the top electrode layer to form a top electrode for receiving the second signal and generating an electric field, by patterning the second layer to form an active layer deformed by the electric field, and by patterning the bottom electrode layer to form a bottom electrode for receiving the first signal; and forming a supporting layer by patterning the first layer.

The step of forming the supporting member and the secondary supporting member is performed concurrently with the step of forming the first layer.

The method for manufacturing the thin film actuated mirror array further comprises a step of forming a reflecting member on the top electrode.

In the thin film AMA according to the present invention, the first signal, which is the picture signal, is applied to the bottom electrode via the electrical wiring, the connecting terminal and a via contact. At the same time, the second signal, which is the bias signal, is applied to the top electrode from the common line.

Thus, an electric field is generated between the top electrode and the bottom electrode. An active layer, which is formed between the top electrode and the bottom electrode, is deformed by such an electric field. The active layer is deformed in a direction perpendicular to the electric field. The actuator having the active layer is actuated upward by a predetermined tilting angle. The reflecting member for reflecting an incident light from a light source tilts with the actuator because the reflecting member is formed on the actuator. So, the reflecting member reflects the incident light from a light source by a predetermined tilting angle, and the light reflected by the reflecting member passes a slit and forms a picture on a screen.

Therefore, the thin film AMA in an optical projection system according to the present invention has a secondary supporting member between the substrate and the supporting layer, thereby reducing the boundary bending moment at the step-up region. Therefore, the initial deflection of the actuator can be reduced and uniformed, thereby increasing the contrast of the picture projected onto a screen.

BRIEF DESCRIPTION OF THE DRAWINGS

The above objects and advantages of the present invention will become more apparent by describing in detail preferred embodiments thereof with reference to the attached drawings, in which:

FIG. 18 illustrates a graph for showing an initial deflection of the actuator in a thin film AMA described in a prior application of the assignee of this application and in the present invention.

DETAILED DESCRIPTION OF THE INVENTION

Hereinafter, the preferred embodiments of the present invention will be explained in more detail with reference to the accompanying drawings.

Embodiment 1

Figure 1:
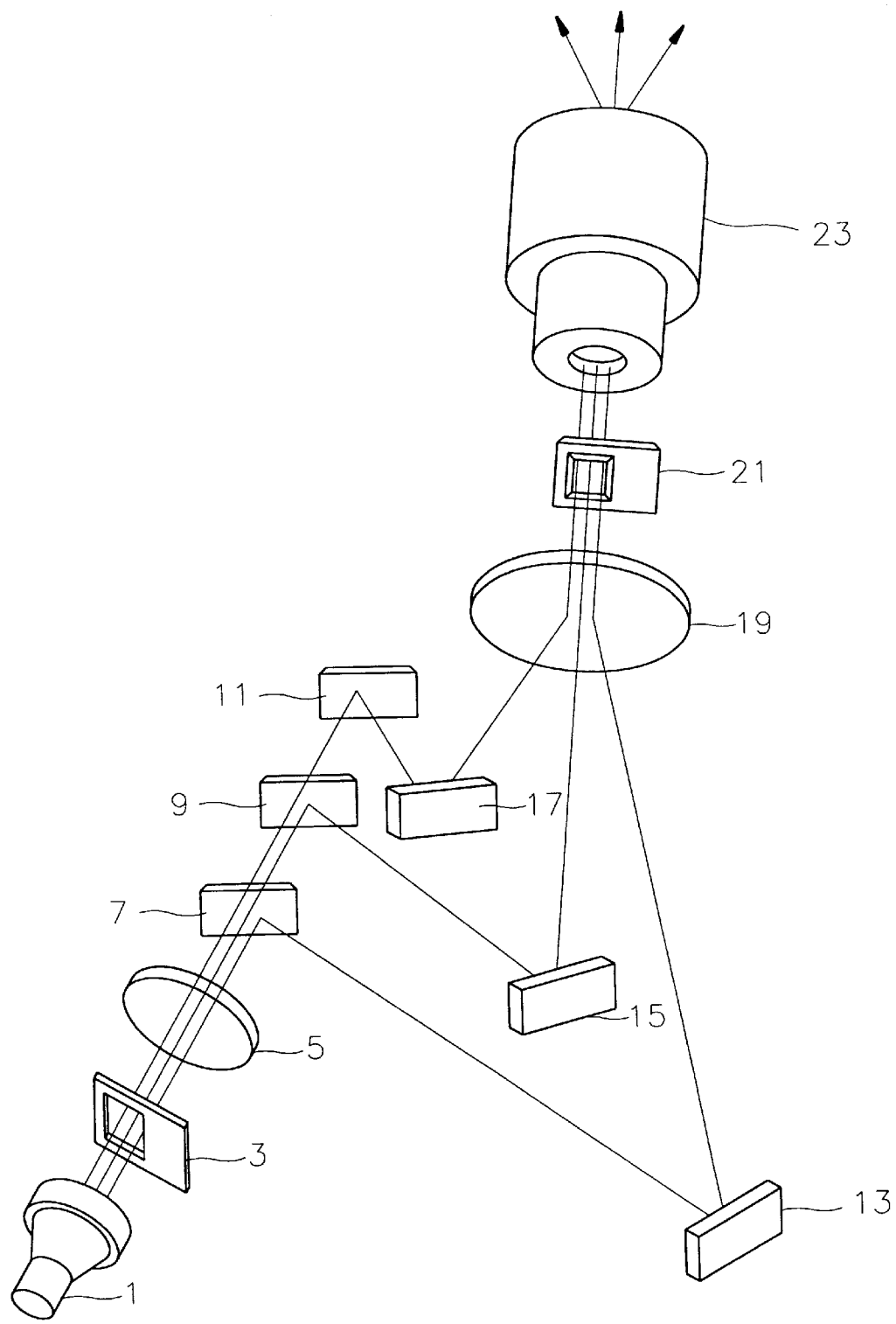
FIG. 1 is a schematic view for showing an engine system of a conventional AMA.
Figure 2:
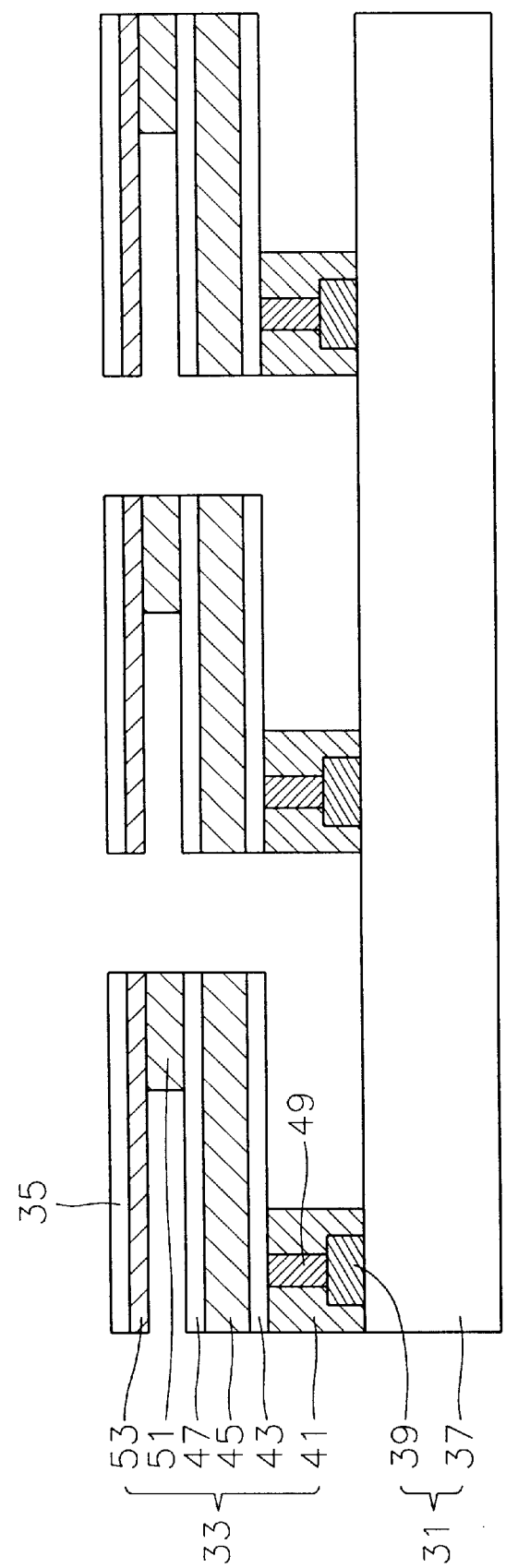
FIG. 2 is a cross-sectional view for showing a thin film AMA described in a prior application of the assignee of this application.
Figure 3A:
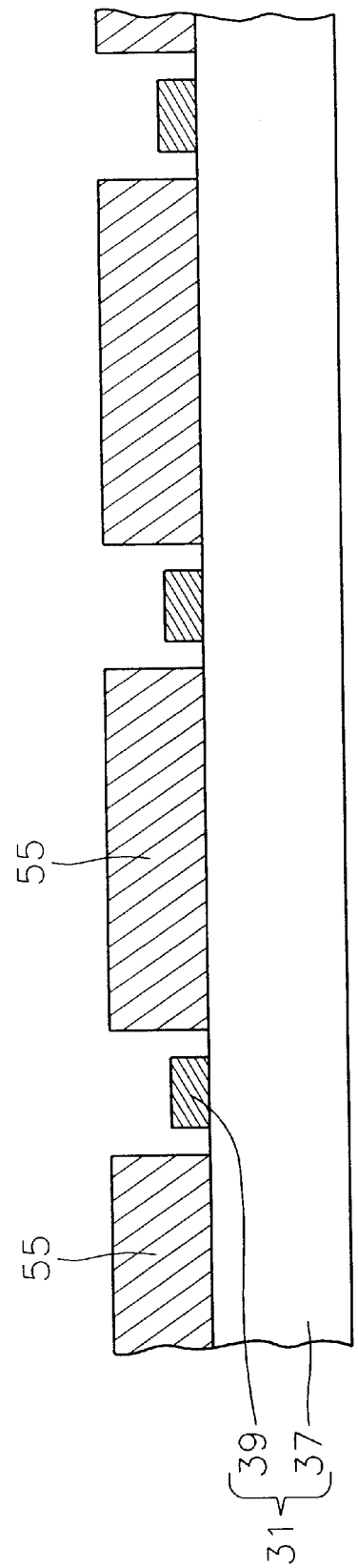
FIGS. 3A to 3D illustrate manufacturing steps of the thin film AMA illustrated in FIG. 2.
Figure 3B:
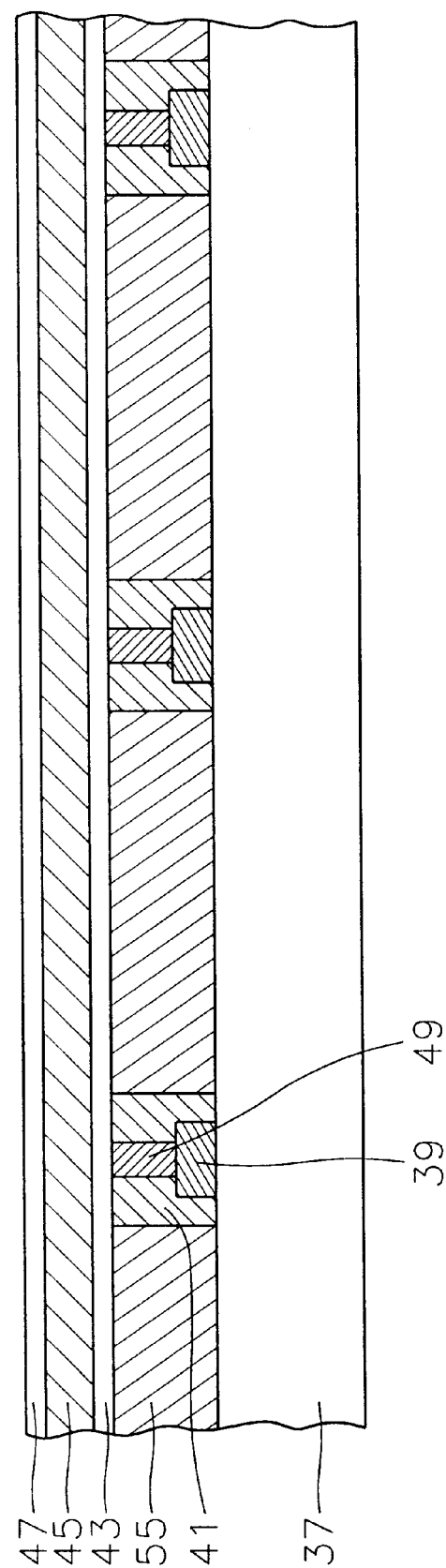
Figure 3C:
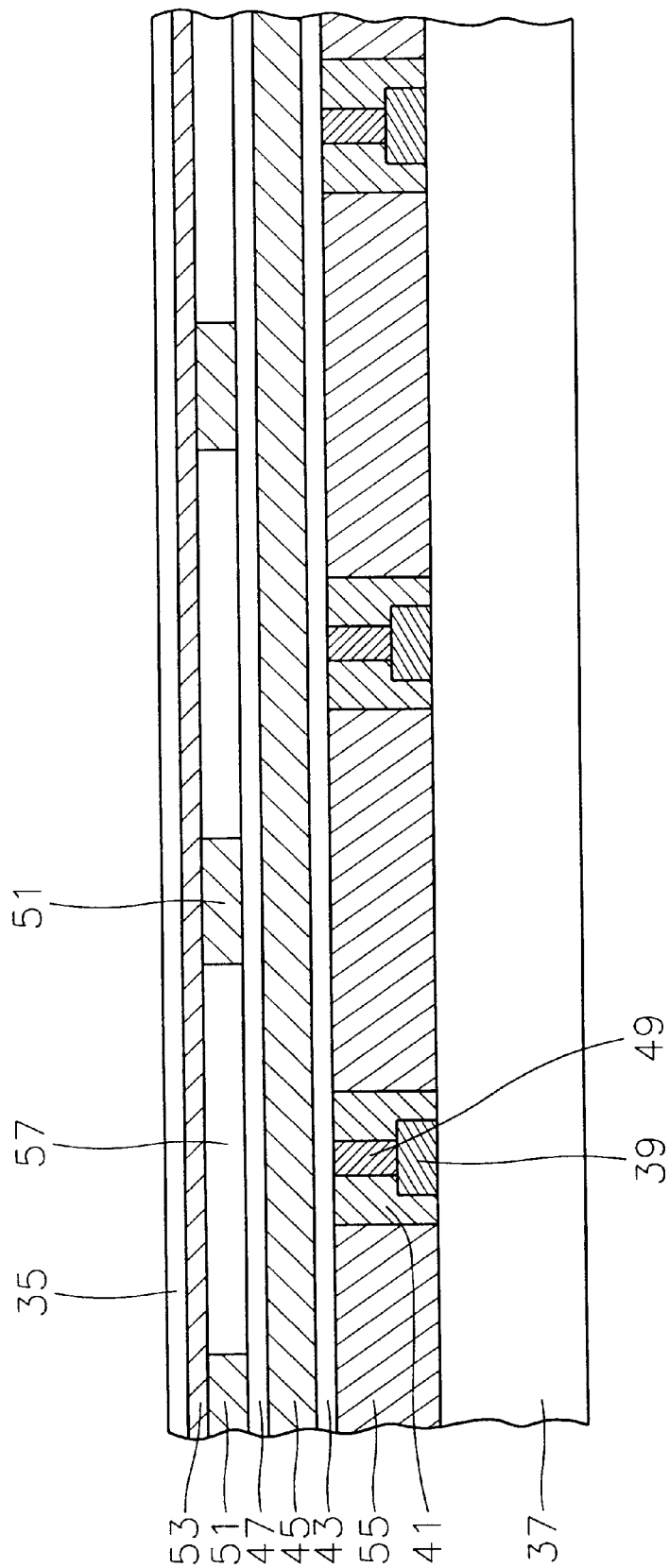
Figure 3D:
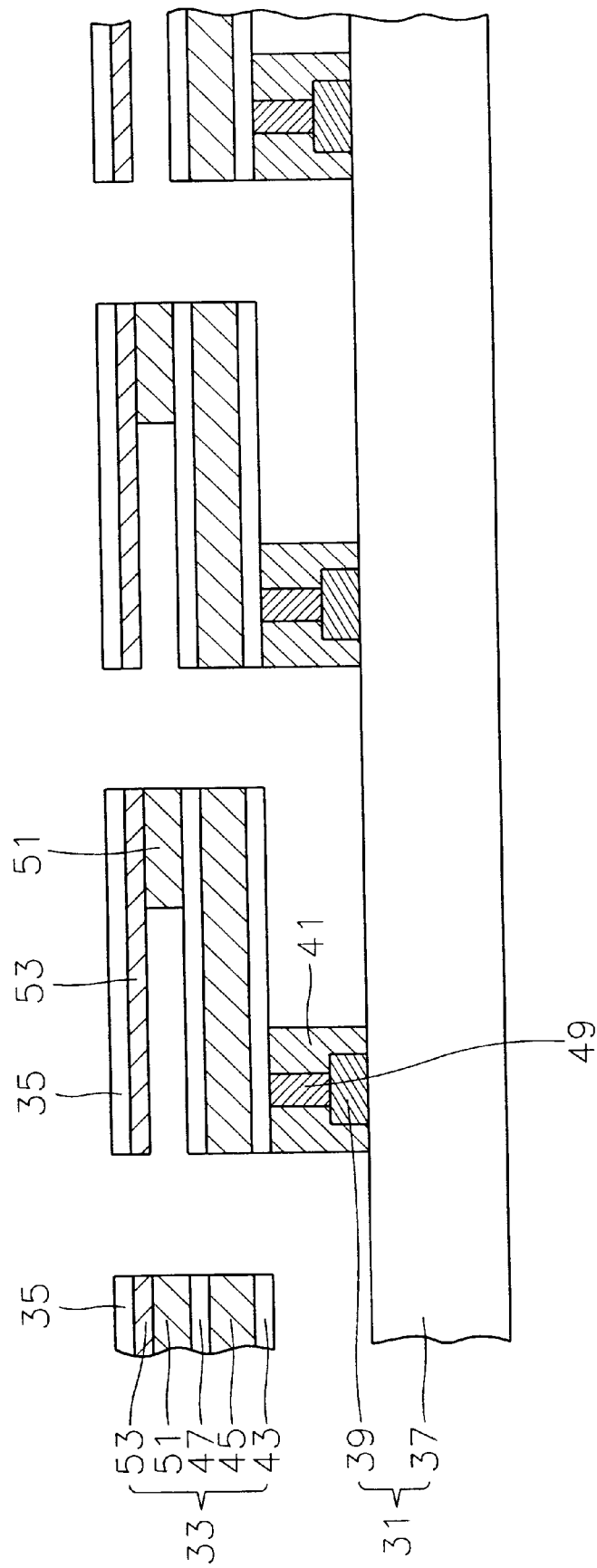
Figure 4:
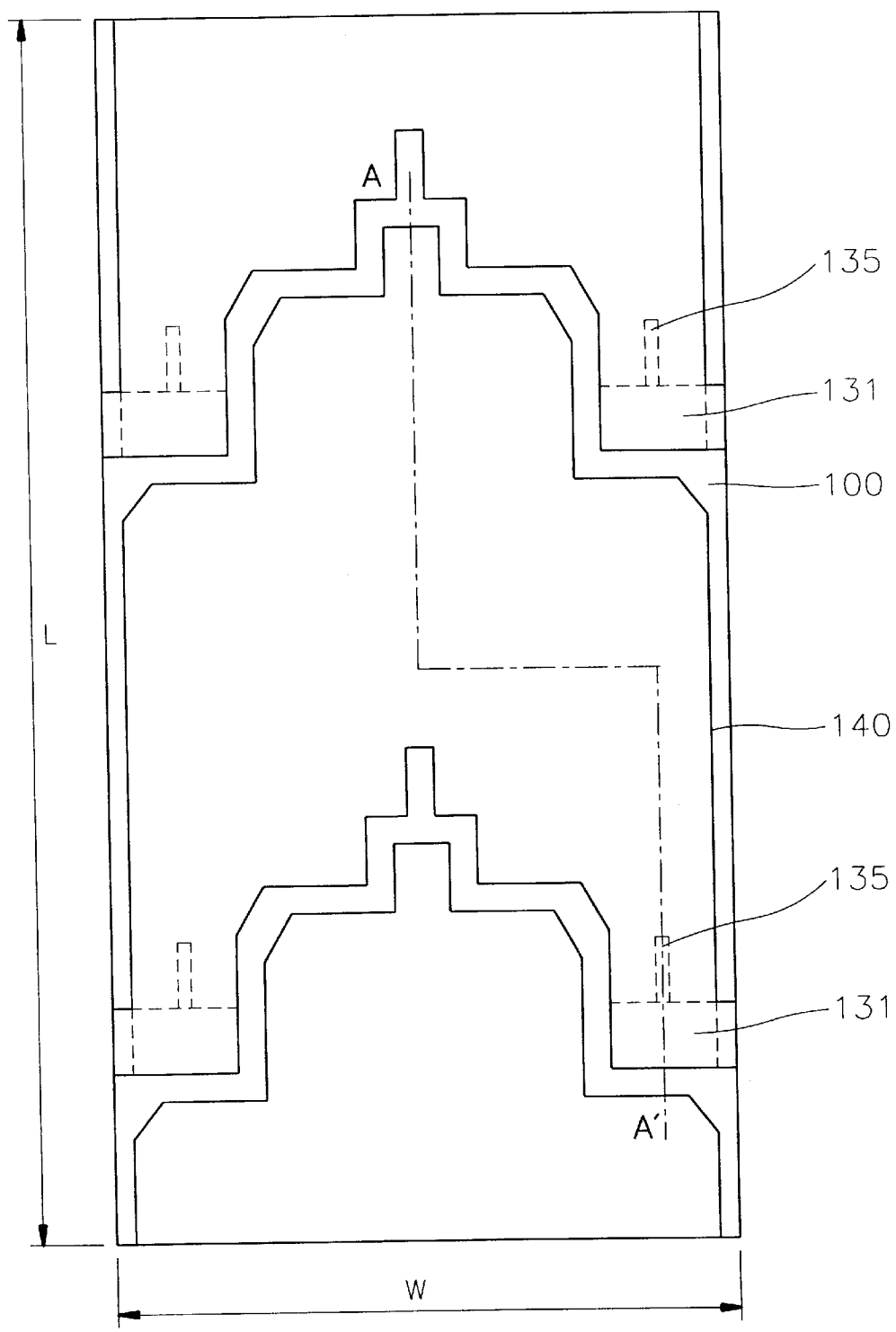
FIG. 4 is a plan view for showing a thin film AMA in an optical projection system according to a first embodiment of the present invention.
Figure 5:
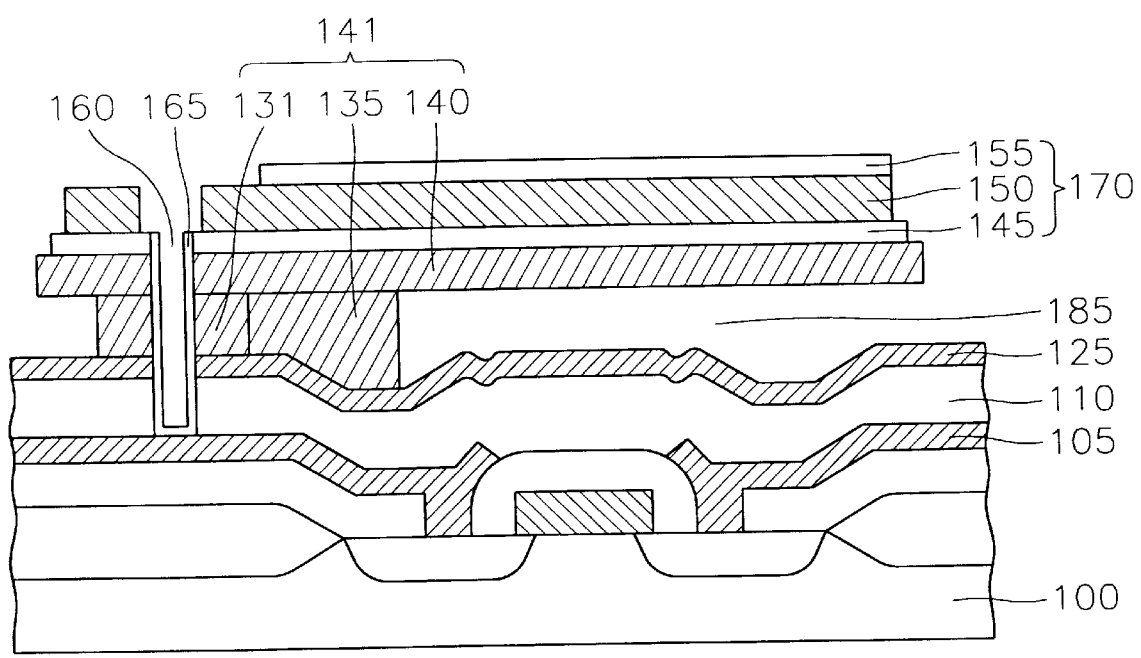
FIG. 5 is a cross-sectional view taken along line A—A' of FIG. 4.

FIG. 4 is a plan view for showing a thin film AMA in an optical projection system according to a first embodiment of the present invention, and FIG. 5 is a cross-sectional view taken along line A—A' of FIG. 4.

Referring to FIGS. 4 and 5, the thin film AMA according to the first embodiment of the present invention has a substrate 100, an actuator 170 formed on the substrate 100, and a supporting element 141 formed between the substrate 100 and the actuator 170 for supporting the actuator 170.

Referring to FIG. 5, the substrate 100 on which an electrical wiring (not shown) is formed has a connecting terminal 105 formed on the electrical wiring, a passivation layer 110 overlaid on the substrate 100 and on the connecting terminal 105, and an etch stop layer 125 overlaid on the passivation layer 110. Preferably, the electrical wiring has a metal oxide semiconductor (MOS) for switching operation.

The actuator 170 has a bottom electrode 145 formed parallel to and above the substrate 100, an active layer 150 overlaid on the bottom electrode 145, and a top electrode 155 overlaid on the active layer 150. An air gap 185 is interposed between the substrate 100 and the bottom electrode 145. Moreover, the actuator 170 has a via hole 160 vertically formed from a portion of the active layer 150 to the connecting terminal 105, and has a via contact 165 formed in the via hole 160. The bottom electrode 145 is electrically connected to the connecting terminal 105 through the via contact 165.

The supporting element 141 has a supporting layer 140 attached to a lower portion of the bottom electrode 145, a supporting member 131 for supporting the actuator 170, and a secondary supporting member 135 for reducing the initial deflection of the actuator 170. The upper portion of the supporting member 131 is attached to a first lower portion of the supporting layer 140 and the lower portion of the supporting member 131 is attached to a part of the etch stop layer 125 under which the connecting terminal 105 is formed. The secondary supporting member 135 is integrally formed with the supporting member 131 between the substrate 100 and the second lower portion of the supporting layer 140. Preferably, the secondary supporting member 135 has a shape of a rectangular pillar whose width is smaller than that of the supporting member 131.

Referring to FIG. 4, the supporting layer 140 has a first portion dented in a rectangular shape in the middle. The dented portion becomes broader from the middle to both sides of the supporting layer 140 in a shape of a staircase. Also, the supporting layer 140 has a second portion protruded so that it corresponds to the first portion. The protruded portion gets narrower from both sides of the supporting layer 140 to the middle in a shape of a staircase. Therefore, the first portion of the supporting layer 140 corresponds to a second portion of a supporting layer in an adjacent actuator, while the second portion of the supporting layer 140 corresponds to a first portion of a supporting layer in an adjacent actuator. The supporting member 131 of the actuator 170 is formed under both sides of the supporting layer 140 as a pillar shape.

A method for manufacturing the thin film AMA in an optical projection system according to the present embodiment will be described as follows.

FIGS. 6 to 10 illustrate manufacturing steps of the thin film AMA according to the first embodiment of the present invention. In FIGS. 6 to 10, the same reference numbers are used for the same elements in FIG. 5.

Figure 6:
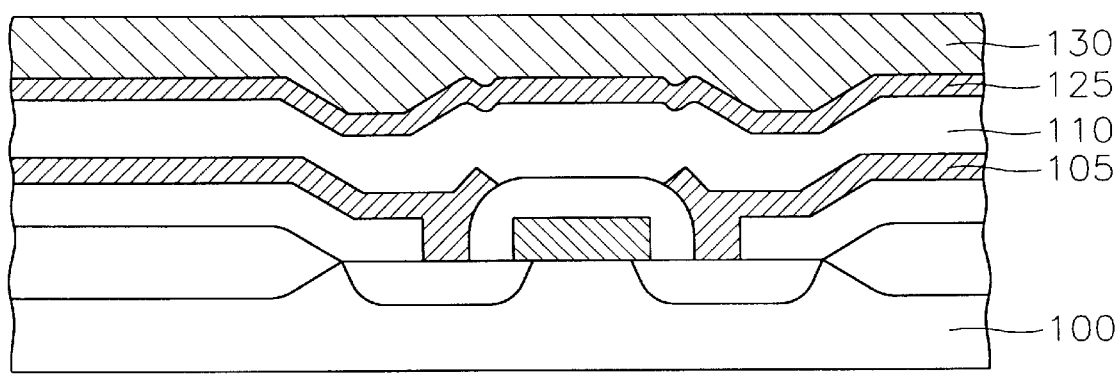
FIGS. 6 to 10 illustrate manufacturing steps of the thin film AMA in an optical projection system illustrated in FIG. 5.

Referring to FIG. 6, the connecting terminal 105 corresponding to the electrical wiring (not shown) is formed on the substrate 100. Preferably, the electrical wiring has a metal oxide semiconductor (MOS) transistor for switching operation. The connecting terminal 105 is formed by using a metal, for example tungsten (W). The connecting terminal 105 is electrically connected to the electrical wiring. The electrical wiring and the connecting terminal 105 receive a first signal from outside and transmit the first signal to the first bottom electrode 145. The first signal is a picture signal.

The passivation layer 110 is overlaid on the connecting terminal 105 and on the substrate 100 by using phosphor-silicate glass (PSG). The passivation layer 110 is formed by a chemical vapor deposition (CVD) method so that the passivation layer 110 has a thickness of between about 0.8 $\mu$m and 1.0 $\mu$m. The passivation layer 110 protects the substrate 100 having the electrical wiring and the connecting terminal 105 during subsequent manufacturing steps.

The etch stop layer 125 is overlaid on the passivation layer 110 by using a nitride so that the etch stop layer 125 has a thickness of between about 1000Å and 2000Å. The etch stop layer 125 is formed by a low pressure chemical vapor deposition (LPCVD) method. The etch stop layer 125 protects the passivation layer 110 and the substrate 100 during successive etching steps.

A sacrificial layer 130 is overlaid on the etch stop layer 125 by using PSG, metal, or oxide. The sacrificial layer 130 is formed by an atmospheric pressure CVD (APCVD) method, a sputtering method, or evaporation method so that the sacrificial layer 130 has a thickness of between about 2.0 $\mu$m and 3.0 $\mu$m. The sacrificial layer 130 makes easy the deposition of subsequent layers consisting of the actuator 170. In this case, the degree of flatness of the sacrificial layer 130 is poor because the sacrificial layer 130 covers the top of the substrate 100 having the electrical wiring and the connecting terminal. Therefore, the surface of the sacrificial layer 130 is planarized by using a spin on glass (SOG) or by a chemical mechanical polishing (CMP) method.

PIG. 7a is a cross-sectional view for showing a patterned state of the sacrificial layer 130 for providing a position where the supporting member 131 of the actuator 170 and the secondary supporting member 135 are formed. FIG. 7b is a plan view for showing a patterned state of the sacrificial layer 130.

Figure 7A:
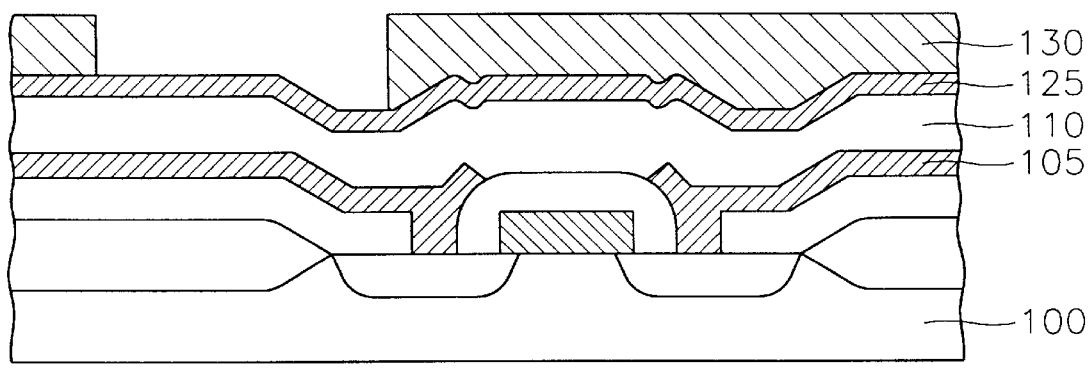
Figure 7B:
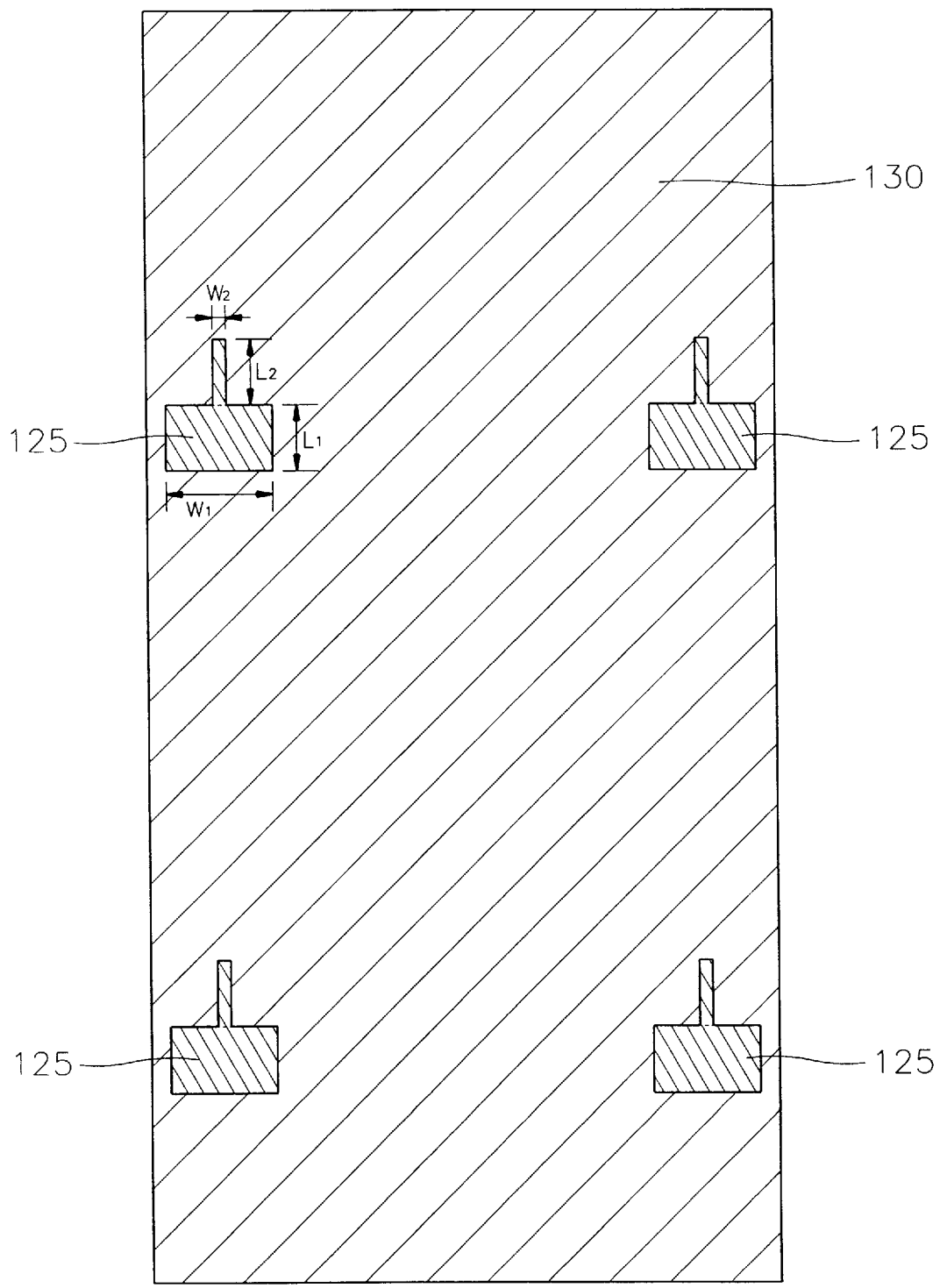

Referring to FIGS. 7a and 7b, a portion of the sacrificial layer 130 under which the connecting terminal 105 is formed is patterned as a rectangle shape in order to expose a portion of the etch stop layer 125. That is, as shown in FIG. 8b, the sacrificial layer 130 is patterned as a rectangular shape having a length of $L_1$ and a width of $W_1$ so as to provide a first position where the supporting member 131 of the actuator 170 is formed. At the same time, the sacrificial layer 130 is patterned from a lateral portion of the supporting member 131 in a shape of a rectangle so as to expose a portion of the etch stop layer 125. That is, as shown in FIG. 7b, the sacrificial layer 130 is patterned from a lateral portion of the supporting member 131 as a rectangular shape having a length of $L_2$ and a width of $W_2$ so as to provide a second position where the secondary supporting member 135 is formed. The cross-sectional area of the first portion is broader than that of the second portion. Preferably, the sacrificial layer 130 is patterned to prepare the first portion and the second portion whose ratio of widths ($W_1$:$W_2$) is between about 4:1 and about 8:1. The ratio of lengths ($L_1$:$L_2$) thereof is between about 2:1 and about 1:1. More preferably, the sacrificial layer 130 is patterned to prepare the first portion and the second portion whose ratio of widths ($W_1$:$W_2$) is about 8:1 and whose ratio of lengths ($L_1$:$L_2$) is about 1:1. For example, in case that the first portion is formed as a rectangular shape having a length of 10 $\mu$m and a width of 16 $\mu$m, the second portion is formed as a rectangular shape having a length of 10 $\mu$m and a width of 2 $\mu$m. Thus, a facet of the secondary supporting member 135 is attached to a facet of the supporting member 131, so that the secondary supporting member 135 is formed integrally with the supporting member 131.

In the conventional thin film AMA in an optical projection system, due to the thickness variations within a processed wafer and due to the uneven residual stresses and stress gradients of the thin film composites within a single pixel, a substantial amount of initial deflection of the actuator right after the release of the sacrificial layer exists. If an initial deflection of the actuator exists due to a step-up boundary bending moment, the picture projected onto a screen shows a drop in contrast.

On the other hand, in the present embodiment, the above-mentioned problems can be solved by reinforcing the structure less sensitive to the pixel-to-pixel residual stress deviations and to the stress gradients. The amount of the step-up boundary bending moment is proportional to the width of the step-up boundary. So, if the secondary supporting member 135 having a narrower width is formed at a lateral portion of the supporting member 131, the step-up boundary bending moment is induced in proportion to the width of the secondary supporting member 135. Therefore, the initial deflection of the actuator 170 can be remarkably reduced. As mentioned above, in case that the width of the supporting member 131 is 16 $\mu$m and the width of the secondary supporting member 135 is 2 $\mu$m, the step-up boundary bending moment is reduced to about one-eighth as compared with a case without the secondary supporting member. Thus, the initial deflection of the actuator 170 without receiving the first signal can be remarkably reduced.

Figure 7C:
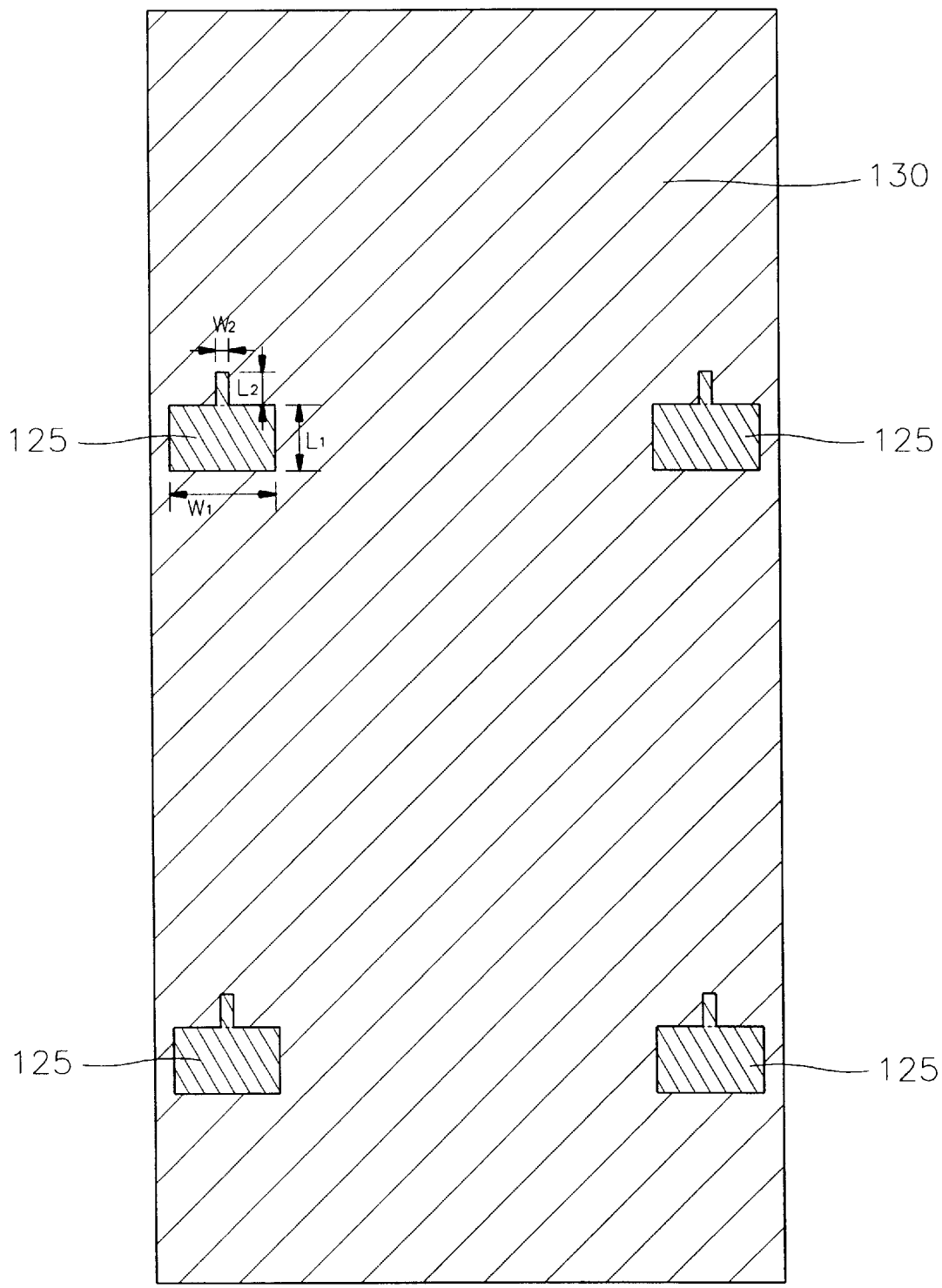

Although preferred ratios of widths ($W_1$:$W_2$) and of lengths ($L_1$:$L_2$) of the supporting member 131 and the secondary supporting member 135 have been described, it is understood that the present embodiment should not be limited to this preferred ratios, but the ratio of widths $W_1$:$W_2$ can be about 8:1 and the ratio of lengths $L_1$:$L_2$ can be about 2:1, as shown in FIG. 7c.

Figure 8:
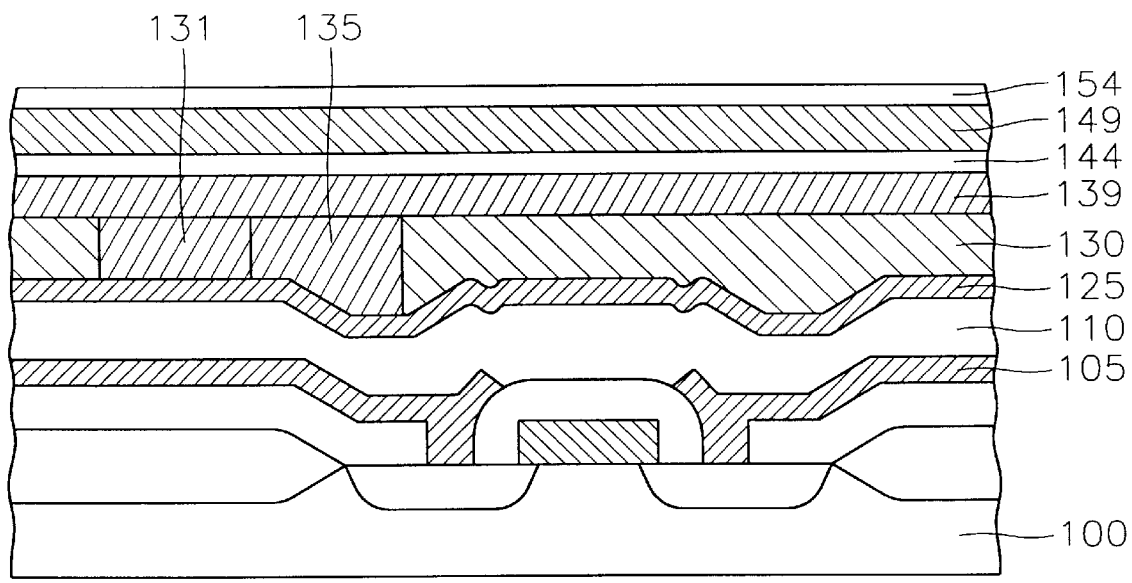

Referring to FIG. 8, a first layer 139 is overlaid on the exposed etch stop layer 125 and on the sacrificial layer 130 by using a rigid material, such as nitride or metal. The first layer 139 is formed by using an LPCVD method so that the first layer 139 has a thickness of between about 0.1 $\mu$m and 1.0 $\mu$m. At this time, the rigid material is overlaid on the sacrificial layer 130 while filling the first portion and the second portion where the supporting member 131 of the actuator 170 and the secondary supporting member 135 are formed. Therefore, the supporting member 131 of the actuator 170 and the secondary supporting member 135 may be formed concurrently with the first layer 139 by using the same material as that of the first layer 139. The first layer 139 is patterned so as to form afterward the supporting layer 140 having a predetermined pixel shape.

A bottom electrode layer 144 is overlaid on the first layer 139. The bottom electrode layer 144 is formed by using an electrically conductive metal such as platinum (Pt), tantalum (Ta), or a platinum-tantalum (Pt-Ta) alloy. The bottom electrode layer 144 is formed by a sputtering method or a CVD method so that the bottom electrode layer 144 has a thickness of between about 0.1 $\mu$m and 1.0 $\mu$m. Subsequently, an iso-cutting (that is isotropically cut) of the bottom electrode layer 144 is performed so as to apply the first signal to each pixel independently. The bottom electrode layer 144 is patterned so as to form the bottom electrode 145 afterward.

A second layer 149 is overlaid on the bottom electrode layer 144. The second layer 149 is formed by using a piezoelectric material such as ZnO, PZT (Pb(Zr, Ti)O$_3$), or PLZT ((Pb, La)(Zr, Ti)O$_3$) so that the second layer 149 has a thickness of between about 0.1 $\mu$m and 1.0 $\mu$m. Also, the second layer 149 can be formed by using an electrostrictive material such as PMN (Pb(Mg, Nb)O$_3$). After forming the second layer 149 by a sol-gel method, a sputtering method, or a CVD method, the second layer 149 is annealed by a rapid thermal annealing (RTA) method. The polling step is needless because the second layer 149 has a thickness below about 1.0 μm. When the second layer 149 is manufactured by using ZnO, the second layer 149 is formed at a low temperature of between 300° C. and 600° C. Hence, a thermal attack in the substrate 100 may be decreased. In this case, the polling step is needless when the second layer 149 is manufactured by using ZnO because the second layer 149 consisting of ZnO is polled by an electric field generated according to the first signal and a second signal. The second layer 149 is patterned so as to form the active layer 150 afterward.

A top electrode layer 154 is overlaid on the second layer 149. The top electrode layer 154 is formed by using an electrically conductive metal, for example aluminum (Al), platinum, or silver (Ag). The top electrode layer 154 is formed by a sputtering method or a CVD method so that the top electrode layer 154 has a thickness of between about 0.1 μm and 1.0 μm.

Figure 9:
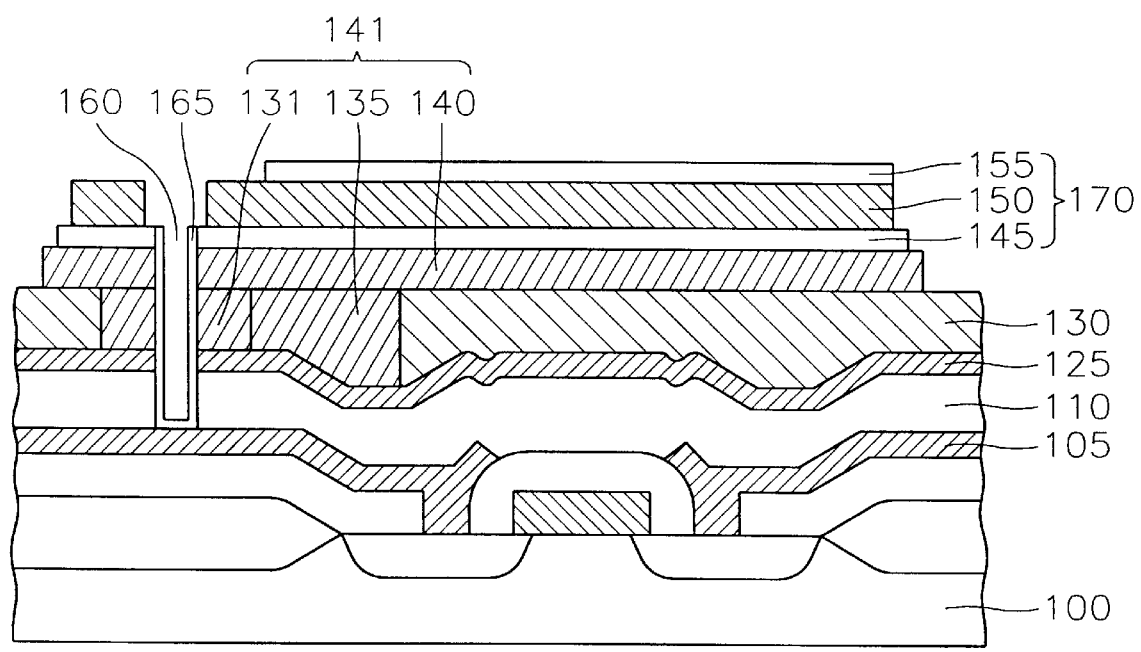

Referring to FIG. 9, after coating a photo resist (not shown) on the top electrode layer 154, the top electrode layer 154 is patterned by using the photo resist as an etching mask, thereby forming the top electrode 155. Then, the photo resist is removed. The second signal is applied to the top electrode 155 from a common line (not shown). The second signal is a bias signal.

The second layer 149 and the bottom electrode layer 144 are patterned by using the same method as that of the top electrode layer 154. The second layer 149 is patterned to form the active layer 150, and the bottom electrode layer 144 is patterned to form the bottom electrode 145. The active layer 150 has the same shape as that of the top electrode 155 and has a broader area than that of the top electrode 155. The bottom electrode 145 also has the same shape as that of the top electrode 155 and has a broader area than that of the active layer 150.

Then, the via hole 160 is formed by etching a portion of the active layer 150, the bottom electrode 145, the first layer 139, the etch stop layer 125, and the passivation layer 110 in due order. Therefore, the via hole 160 is formed from a portion of the active layer 150 to an upper portion of the connecting terminal 105. Then, the via contact 165 is formed in the via hole 160 by using an electrically conductive metal, for example tungsten, aluminum, or titanium. The via contact 165 is formed by a sputtering method and patterned. The via contact 165 electrically connects the connecting terminal to the bottom electrode 145. So, the first signal applied from outside is applied to the bottom electrode 145 via the electrical wiring, the connecting terminal 105, and the via contact 165. Then, the first layer 139 is patterned to form the supporting layer 140 having a predetermined pixel shape. In this case, the supporting layer 140 has a broader area than that of the bottom electrode 145.

The first signal, which is the picture signal, is applied to the bottom electrode 145 via the electrical wiring, the connecting terminal, and the via contact 165. Therefore, when the first signal is applied to the bottom electrode 145, at the same time, the second signal is applied to the top electrode 155, an electric field is generated between the top electrode 155 and the bottom electrode 145. Thus, the active layer 150 is deformed by such an electric field.

Figure 10:
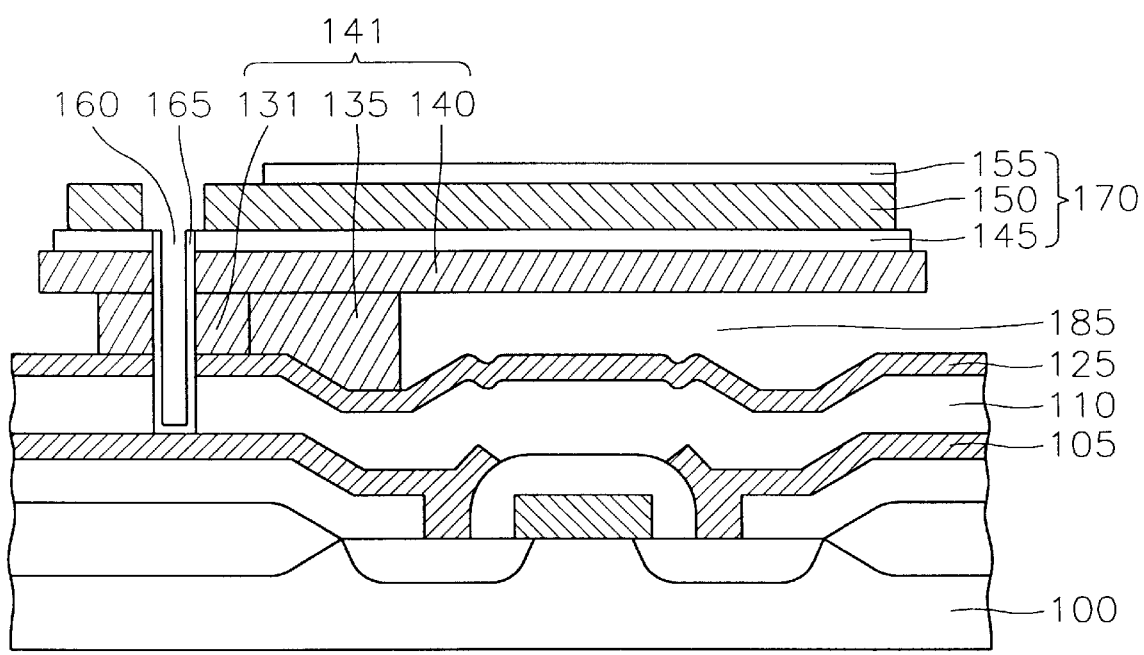

Referring to FIG. 10, the sacrificial layer 130 is removed by using a vapor of hydrogen fluoride (HF). When the sacrificial layer 130 is removed, the air gap 185 is formed at a position where the sacrificial layer 130 had been positioned, and the actuator 170 is completed.

The operation of the thin film AMA in an optical projection system according to the present embodiment will be described.

In the thin film AMA according to the present embodiment, the first signal, which is the picture signal, is applied to the bottom electrode 145 via the electrical wiring, the connecting terminal 105, and the via contact 165. At the same time, the second signal, which is the bias signal, is applied to the top electrode 155 from the common line (not shown).

Thus, an electric field is generated between the top electrode 155 and the bottom electrode 145. The active layer 150 formed between the top electrode 155 and the bottom electrode 145 is deformed. The active layer 150 is deformed in a direction perpendicular to the electric field. Thus, the actuator 170 having the active layer 150 is actuated upward by a predetermined tilting angle. The top electrode 155 for reflecting an incident light from a light source tilts together with the actuator 170. Therefore, the top electrode 155 reflects the incident light from the light source by a predetermined tilting angle, and the light reflected by the top electrode 155 passes a slit and forms a picture on a screen.

The initial deflection of the actuator according to the present embodiment is determined by using an interferometer and a method of laser measurement. The initial deflection value of the actuator is obtained to be 3.10 to 3.90 μm.

Embodiment 2

Figure 11:
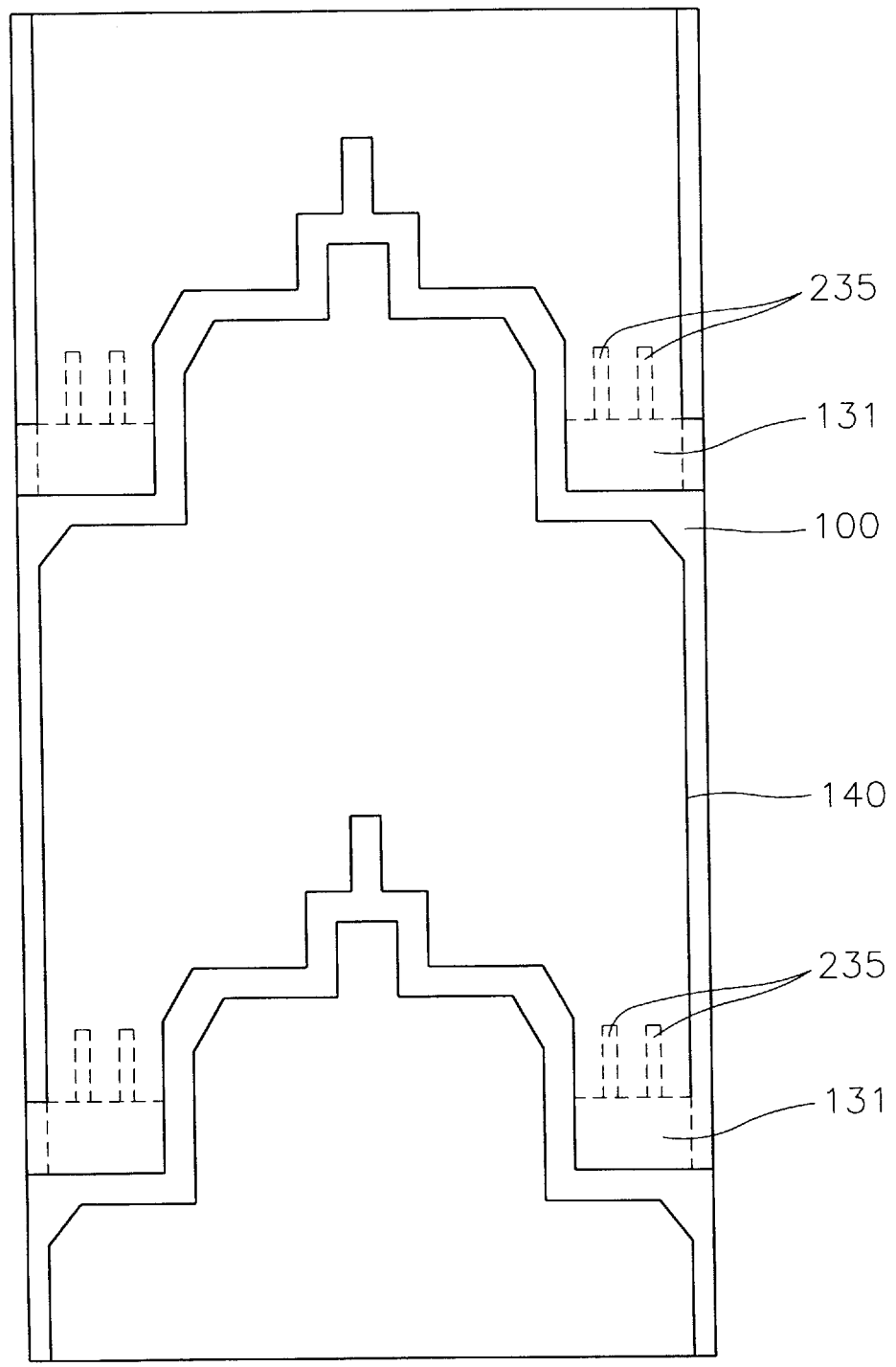
FIG. 11 is a plan view for showing a thin film AMA in an optical projection system according to a second embodiment of the present invention.
Figure 12:
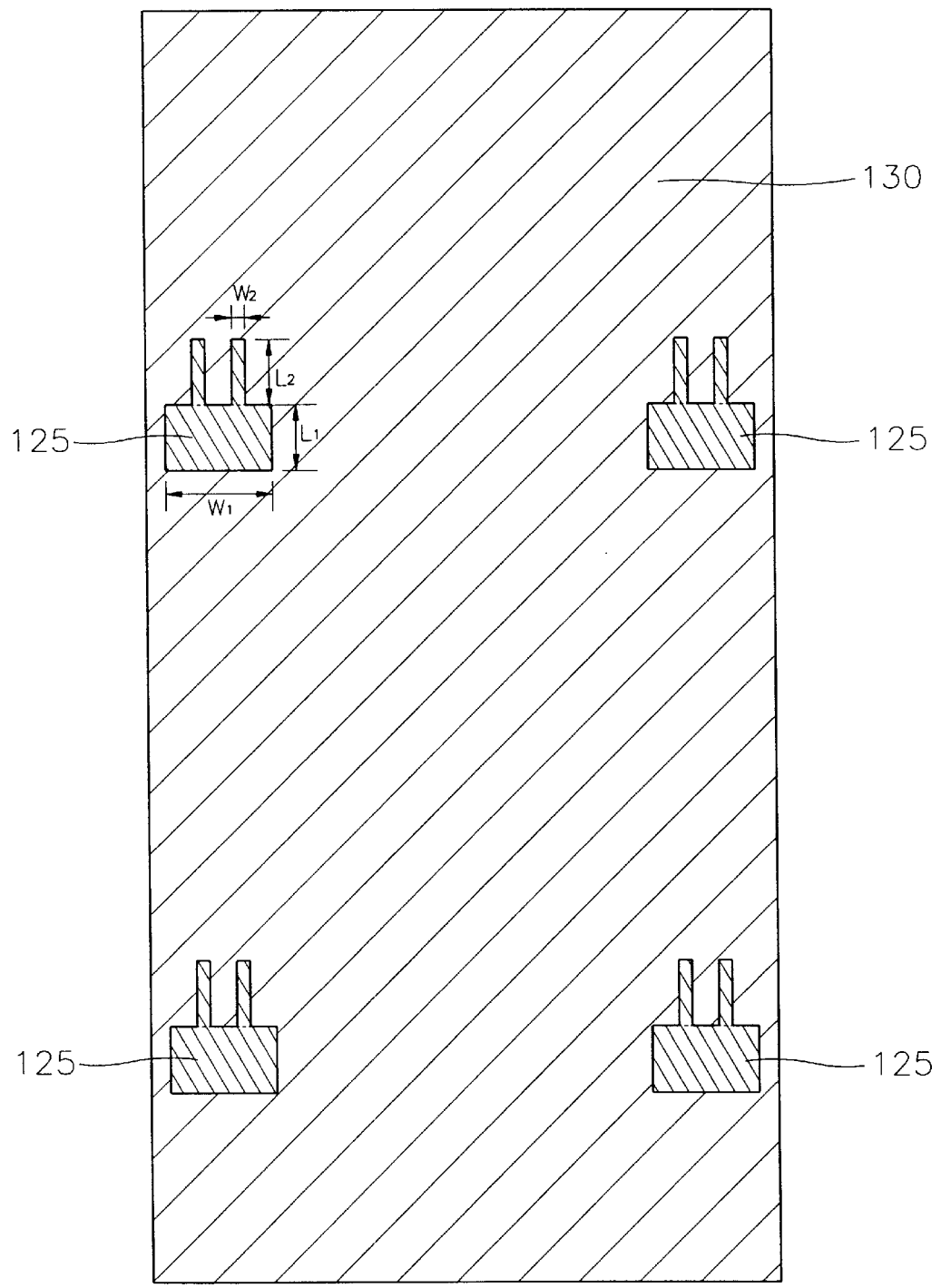
FIG. 12 is a plan view for showing a patterned state of a sacrificial layer in manufacturing steps of the thin film AMA illustrated in FIG. 11.

FIG. 11 is a plan view for showing a thin film AMA in an optical projection system according to a second embodiment of the present invention, and FIG. 12 is a plan view for showing a patterned state of the sacrificial layer 130 in manufacturing steps of the thin film AMA illustrated in FIG. 11. The plan view and the cross-sectional view of the thin film AMA according to the second embodiment of the present invention have the same structural elements and the same shapes as those of the first embodiment of the present invention shown in FIG. 4 and FIG. 5, except that two secondary supporting members 235 are formed. In the second embodiment of the present invention, the same reference numbers are used for the same elements in the first embodiment of the present invention.

Hereinafter, the manufacturing method of the thin film AMA according to the present embodiment will be explained in more detail with reference to the accompanying drawings.

In the thin film AMA according to the third embodiment of the present invention, the steps until the sacrificial layer 130 is formed and planarized are the same as those of the first embodiment of the present invention shown in FIG. 6.

Referring to FIG. 12, a portion of the sacrificial layer 130 under which the connecting terminal 105 is formed is patterned as a rectangular shape so as to provide the first position where the supporting member 131 is formed, thereby exposing a portion of the etch stop layer 125. The first position has the same size as that of the first embodiment. Also, the sacrificial layer 130 is patterned to form the second positions where the secondary supporting members 235 are formed. That is, each of the second positions is formed from a lateral portion of the supporting member 131 in a shape of a rectangle whose size is the same as that of the first embodiment. Therefore, a facet of the secondary supporting members 235 are respectively attached to a facet of the supporting member 131, so that the secondary supporting member 235 are respectively formed integrally with the supporting member 131. The two positions are separated from each other by a predetermined distance and are formed parallel to each other.

Preferably, the sacrificial layer 130 is patterned to prepare the first portion and the second portion whose ratio of widths ($W_1:W_2$) is about 8:1 and whose ratio of lengths ($L_1:L_2$) is about 1:1. For example, in case that the first portion is formed as a rectangular shape having a length of 10 μm and a width of 16 μm, each of the second portions is formed as a rectangular shape having a length of 10 μm and a width of 2 μm.

In the second embodiment of the present invention, the following steps of the manufacturing and the operation of the thin film AMA are the same as those of the first embodiment of the present invention shown in FIGS. 8 to 10.

The initial deflection of the actuator according to the present embodiment is determined by using an interferometer and a method of laser measurement. The initial deflection value of the actuator is obtained to be 3.70 to 5.15 μm.

Embodiment 3

Figure 13:
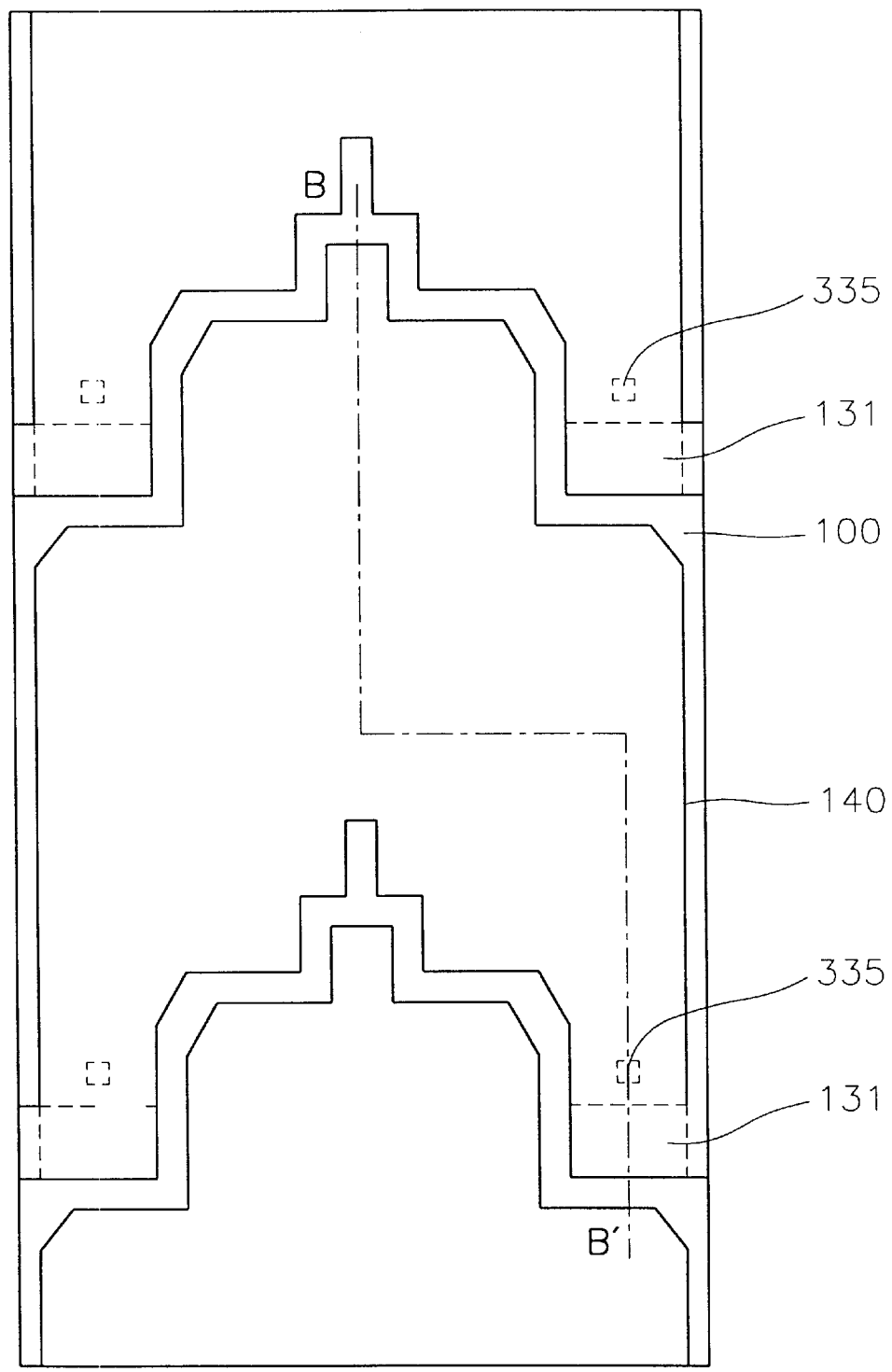
FIG. 13 is a plan view for showing a thin film AMA in an optical projection system according to a third embodiment of the present invention.
Figure 14:
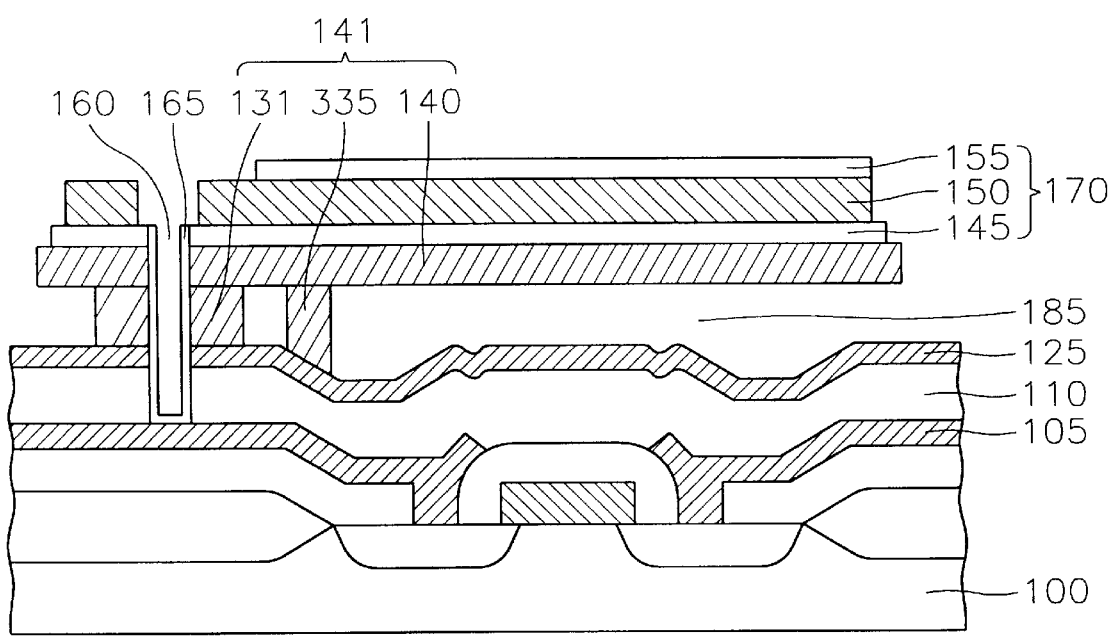
FIG. 14 is a cross-sectional view taken along line B—B' of FIG. 13.

FIG. 13 is a plan view for showing a thin film AMA in an optical projection system according to a third embodiment of the present invention, and FIG. 14 is a cross-sectional view taken along line B—B' of FIG. 13.

The plan view and the cross-sectional view of the thin film AMA according to the third embodiment of the present invention have the same structural elements and the same shapes as that of the first embodiment of the present invention shown in FIG. 4 and FIG. 5, except that the secondary supporting member 335 is formed apart from the supporting member 131 by a predetermined distance. In the third embodiment of the present invention, the same reference numbers are used for the same elements in the first embodiment of the present invention.

Hereinafter, the manufacturing method of the thin film AMA according to the present embodiment will be explained in more detail with reference to the accompanying drawings.

Figure 15A:
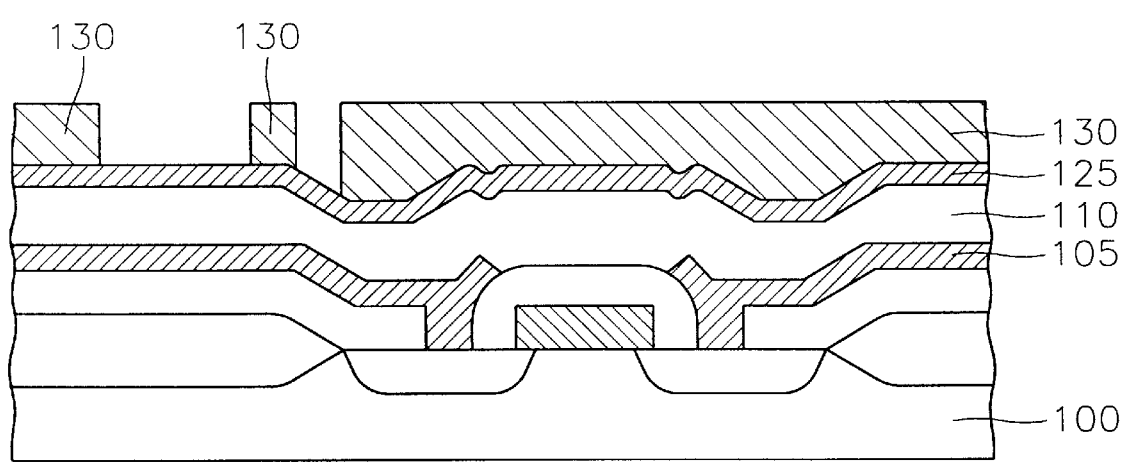
FIG. 15a is a cross-sectional view for showing a patterned state of a sacrificial layer in manufacturing steps of the thin film AMA illustrated in FIG. 14.

In the thin film AMA according to the third embodiment of the present invention, the steps until the sacrificial layer 130 is formed and planarized are the same as those of the first embodiment of the present invention shown in FIG. 6. FIG. 15a is a cross-sectional view for showing a patterned state of the sacrificial layer 130 in manufacturing steps of the thin film AMA illustrated in FIG. 14, and FIG. 15b is a plan view for showing a patterned state of the sacrificial layer 130 in manufacturing steps of the thin film AMA illustrated in FIG. 14.

Figure 15B:
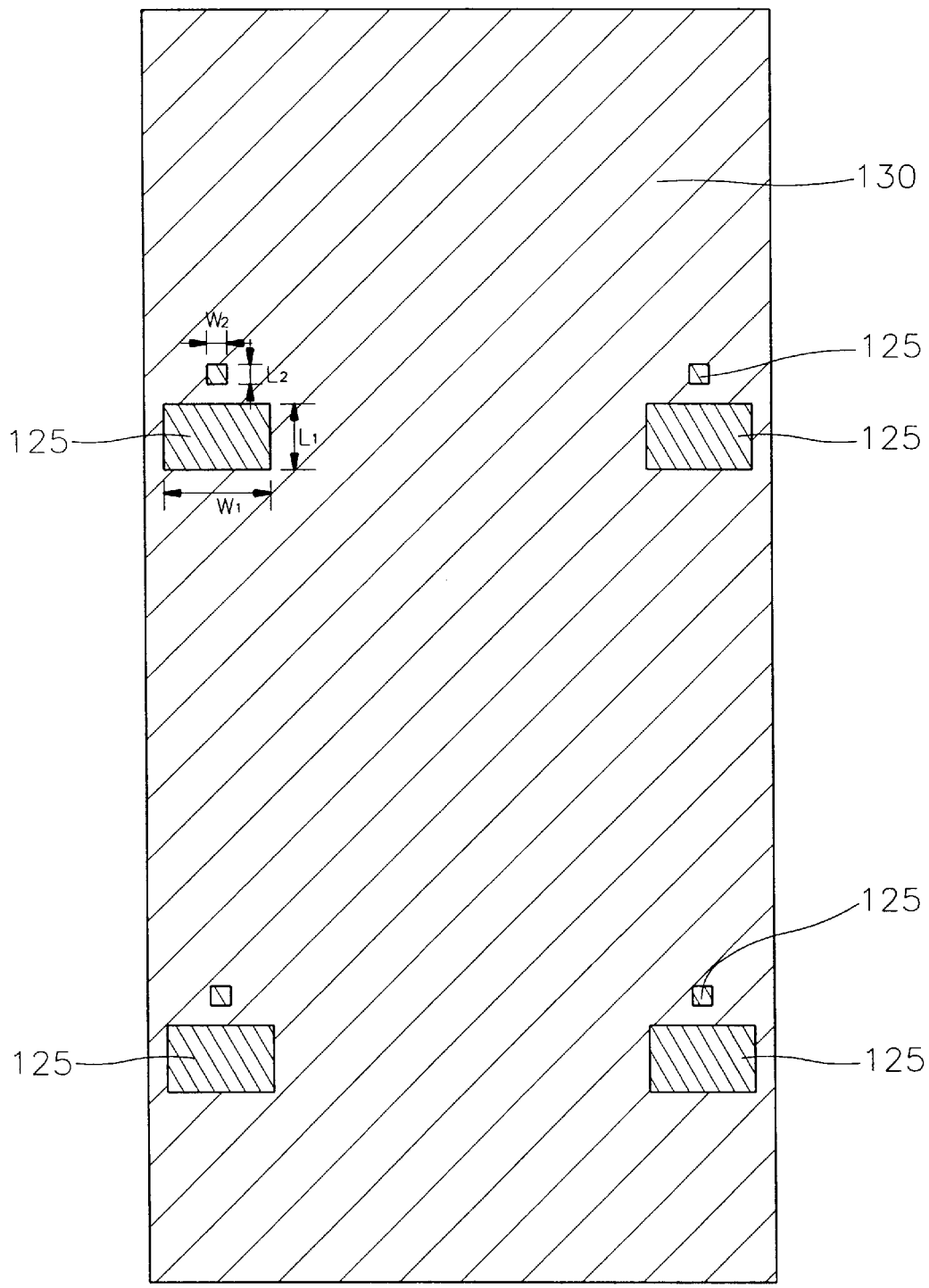
FIG. 15b is a plan view for showing a patterned state of a sacrificial layer in manufacturing steps of the thin film AMA illustrated in FIG. 14.

Referring to FIGS. 15a and 15b, a portion of the sacrificial layer 130 under which the connecting terminal 105 is formed is patterned as a rectangular shape so as to provide the first position where the supporting member 131 is formed. The first position has the same size as that of the first embodiment.

At the same time, the sacrificial layer 130 is patterned as a rectangular shape apart from the supporting member 131 by a predetermined distance, thereby providing the second position where the secondary supporting member 335 is formed.

Preferably, the sacrificial layer 130 is patterned to prepare the first portion and the second portion whose ratio of widths ($W_1:W_2$) is between about 4:1 and about 8:1 and whose ratio of lengths ($L_1:L_2$) is between about 5:1 and about 2:1. More preferably, the sacrificial layer 130 is patterned to prepare the first portion and the second portion whose ratio of widths ($W_1:W_2$) is about 16:3 and whose ratio of lengths ($L_1:L_2$) is about 10:3. For example, in case that the first portion is formed as a rectangular shape having a length of 10 μm and a width of 16 μm, the second portion is formed as a square shape having a length of 3 μm and a width of 3 μm. Therefore, the secondary supporting member 335 has a square pillar shape apart from the supporting member 131 by a predetermined distance.

Figure 15C:
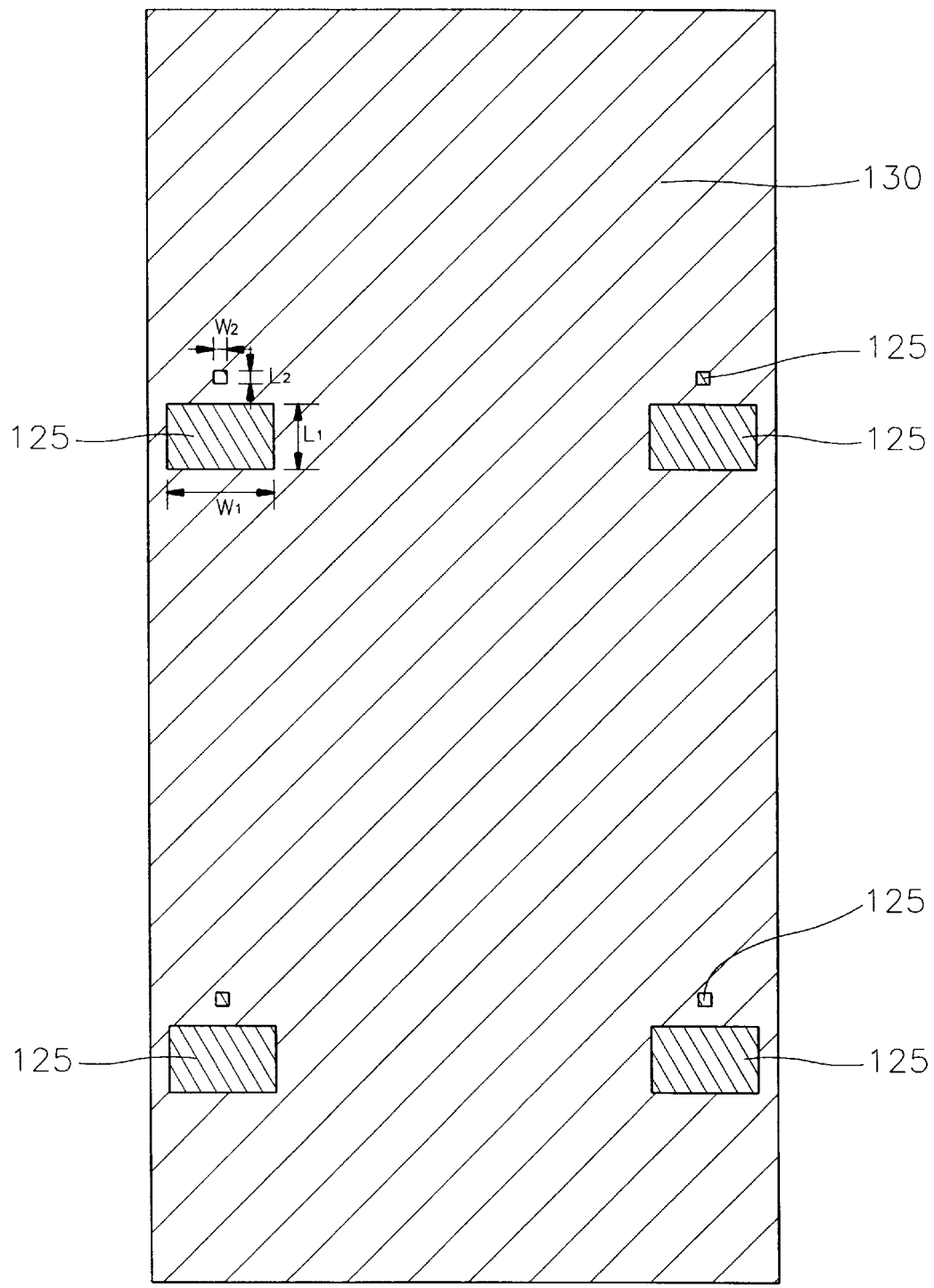
FIGS. 15c to FIG. 15e is a plan view for showing another patterned states of a sacrificial layer in manufacturing steps of the thin film AMA illustrated in FIG. 14.
Figure 15D:
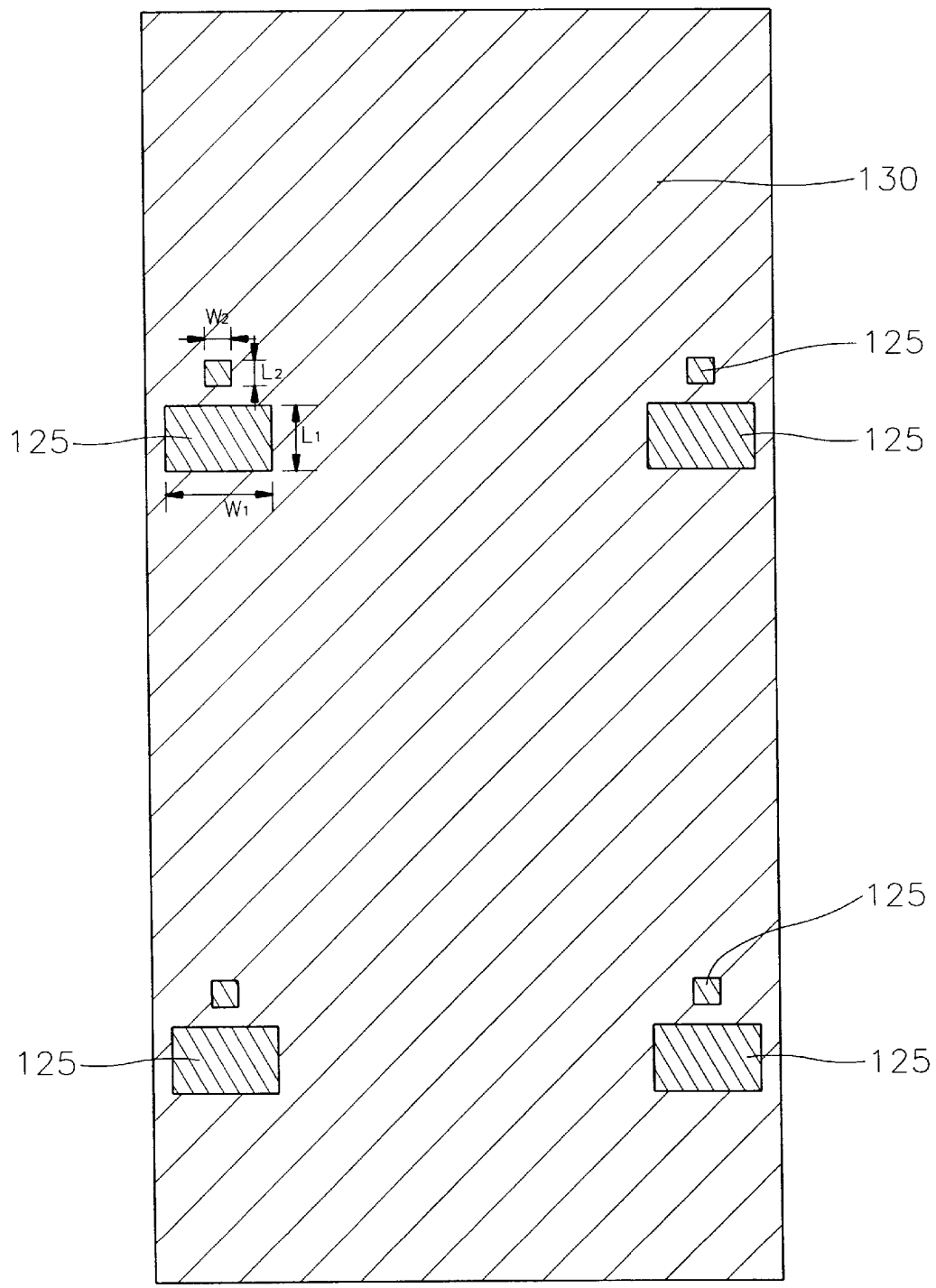
Figure 15E:
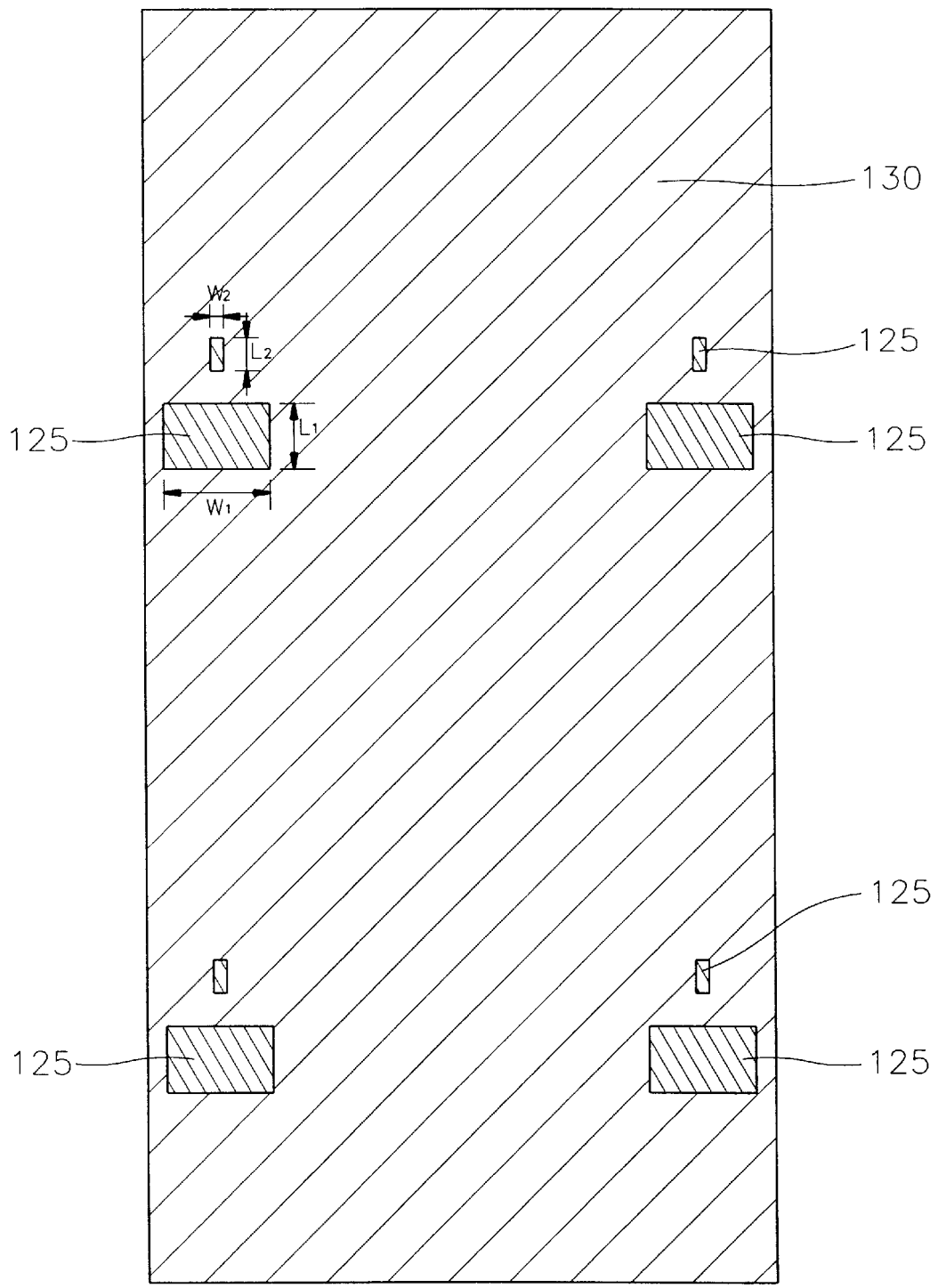

Although preferred ratios of widths ($W_1:W_2$) and of lengths ($L_1:L_2$) of the supporting member 131 and the secondary supporting member 335 have been described, it is understood that the present embodiment should not be limited to this preferred ratios, but the ratio of widths $W_1:W_2$ can be about 8:1 or 4:1 and the ratio of lengths $L_1:L_2$ can be about 5:1, 5:2, or 2:1 as shown in FIG. 15c to FIG. 15e.

In the third embodiment of the present invention, the following steps of the manufacturing and the operation of the thin film AMA in the optical projection system are the same as those of the first embodiment of the present invention shown in FIGS. 8 to 10.

The initial deflection of the actuator according to the present embodiment is determined by using an interferometer and a method of laser measurement. The initial deflection value of the actuator is obtained to be 4.85 to 5.85 μm.

Embodiment 4

Figure 16:
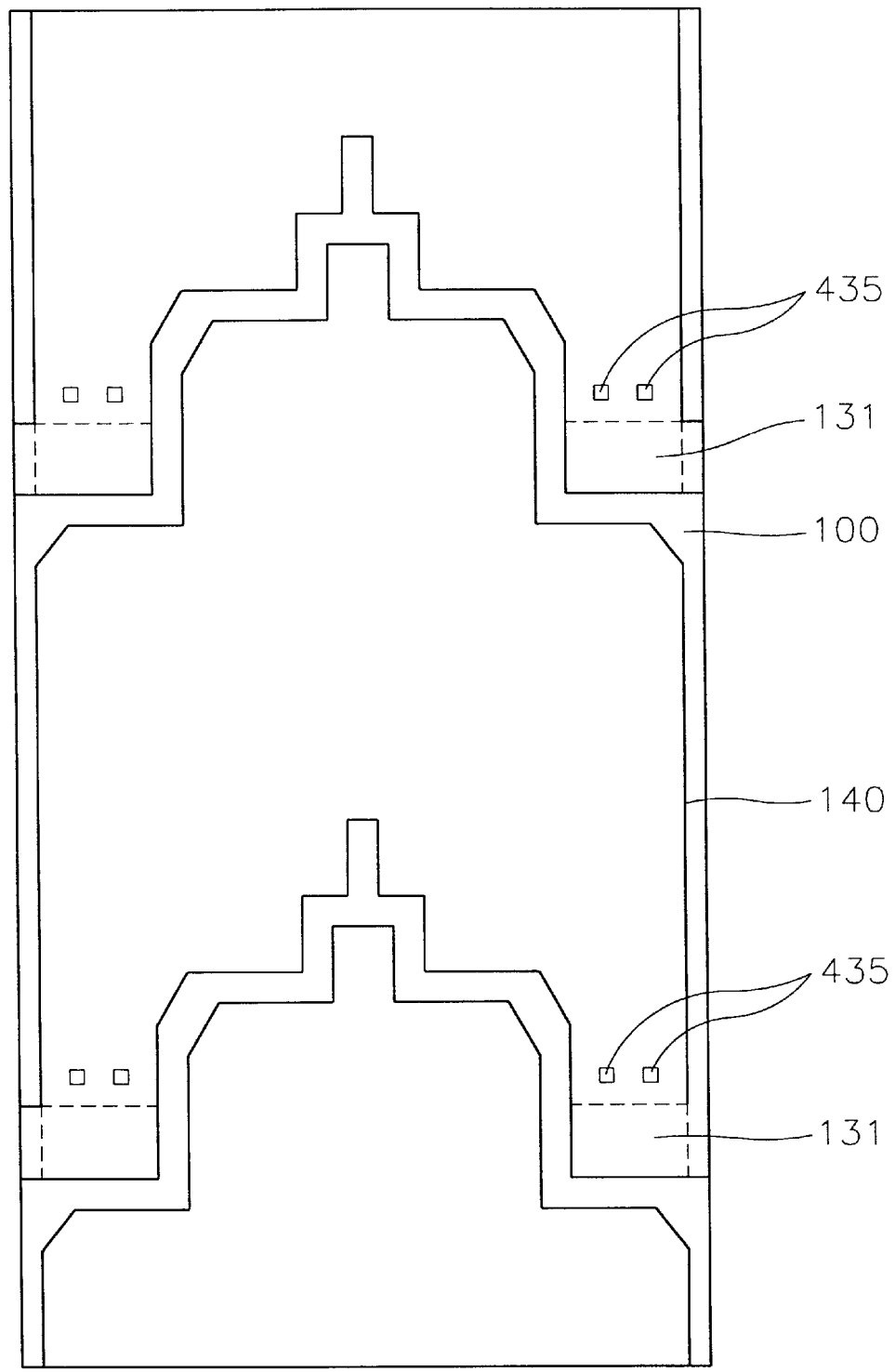
FIG. 16 is a plan view for showing a thin film AMA in an optical projection system according to a fourth embodiment of the present invention.
Figure 17:
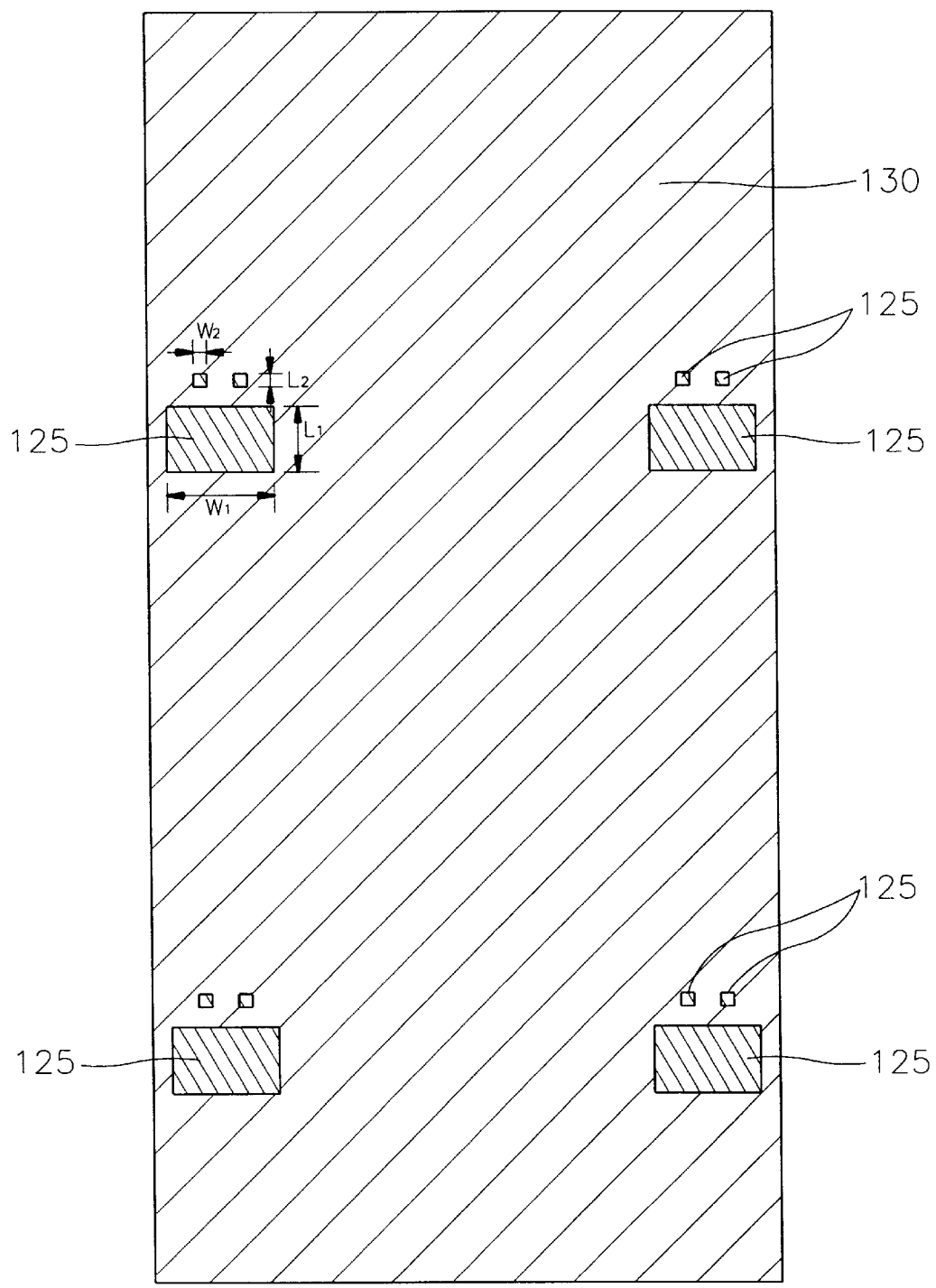
FIG. 17 is a plan view for showing a patterned state of a sacrificial layer in manufacturing steps of the thin film AMA illustrated in FIG. 16.

FIG. 16 is a plan view for showing a thin film AMA in an optical projection system according to a fourth embodiment of the present invention, and FIG. 17 is a plan view for showing a patterned state of a sacrificial layer in manufacturing steps of the thin film AMA illustrated in FIG. 16. The plan view and the cross-sectional view of the thin film AMA according to the fourth embodiment of the present invention have the same structural elements and the same shapes as that of the third embodiment of the present invention shown in FIG. 13 and FIG. 14, except that two secondary supporting members 435 are formed apart from the supporting member 131 by a predetermined distance. In the fourth embodiment of the present invention, the same reference numbers are used for the same elements in the first embodiment of the present invention.

Hereinafter, the manufacturing method of the thin film AMA according to the present embodiment will be explained in more detail with reference to the accompanying drawings.

In the thin film AMA according to the fourth embodiment of the present invention, the steps until the sacrificial layer 130 is formed and planarized are the same as those of the first embodiment of the present invention shown in FIG. 6.

Referring to FIG. 17, a portion of the sacrificial layer 130 under which the connecting terminal 105 is formed is patterned as a rectangular shape so as to provide the first position where the supporting member 131 is formed, thereby exposing a portion of the etch stop layer 125. The first position has the same size as that of the first embodiment. Simultaneously, the sacrificial layer 130 is patterned in a shape of a rectangle to form the second positions where the secondary supporting members 435 are formed. That is, each of the second positions is formed apart from the supporting member 131 by a predetermined distance. Therefore, the two positions are separated from each other by a predetermined distance and are formed parallel to each other.

Preferably, the sacrificial layer 130 is patterned to prepare the first portion and the second portion whose ratio of widths ($W_1:W_2$) is about 8:1 and whose ratio of lengths ($L_1:L_2$) is about 5:1. For example, in case that the first portion is formed as a rectangular shape having a length of 10 μm and a width of 16 μm, each of the second portions is formed as a square shape having a length of 2 μm and a width of 2 μm.

In the fourth embodiment of the present invention, the following steps of the manufacturing and the operation of the thin film AMA are the same as those of the first embodiment of the present invention shown in FIGS. 8 to 10.

The initial deflection of the actuator according to the present embodiment is found out by using an interferometer and a method of laser measurement. The initial deflection value of the actuator is obtained to be 3.55 to 5.20 μm.

FIG. 18 illustrates a graph for showing an initial deflection of the actuator in the thin film AMA described in a prior application of the assignee of this application and in the present invention. The thin film AMA described in a prior application, which has no secondary supporting member, corresponds to the comparative example. The initial deflection of the thin film AMA according to the embodiments of the present invention is found out by using an interferometer and a method of laser measurement. The initial deflection value of the thin film AMA according to the comparative example is obtained to be 6.00 to 7.40 μm.

Referring to FIG. 18, as compared with the result of the comparative example, it is understood that the deviation and the absolute value of the initial deflection in the thin film AMA prepared according to the embodiments of the present invention is very low. Therefore, it is understood that reinforcing a secondary supporting member between the substrate and the supporting layer is very effective in reducing uneven residual stresses and stress gradients of the actuator, thereby making the initial deflection of the actuator uniform.

Further, in a case that one secondary supporting member is formed (for example, embodiment 1 or embodiment 3), the deviation and the absolute value of the initial deflection of the actuator 170 are relatively low. While, in case that two secondary supporting members are formed (for example, embodiment 2 or embodiment 4), though the absolute value of the initial deflection in the actuator 170 is low, the deviation thereof is high. Thus, it is known that the thin film AMA having one secondary supporting member is preferable to that having two secondary supporting members.

In the present invention, the cross sections of the supporting member and the secondary supporting member are a rectangular shape, but the supporting member and the secondary supporting member may have a circular shape. Moreover, in a case of applying the same method as that of the embodiments of the present invention, the step-up boundary bending moment induced in proportion to the width of the secondary supporting member can be remarkably reduced by forming the shape of a portion of the secondary supporting member keener. So that a thin film AMA in which the deviation and the absolute value of the initial deflection of the actuator are considerably reduced can be manufactured.

In addition, the secondary supporting member can be formed concurrently with the supporting member when the sacrificial layer is patterned. That is, the secondary supporting member can be formed by changing the mask used for patterning the sacrificial layer. Thus, the secondary supporting member can be easily formed without a variation in the manufacturing steps, which is hard to control.

Although preferred embodiments of the present invention have been described, it is understood that the present invention should not be limited to this preferred embodiments, but various changes and modifications can be made by one skilled in the art within the spirit and scope of the invention as hereinafter claimed.

What is claimed is:

1. A thin film actuated mirror array comprising:
   a substrate having electrical wiring and a connecting terminal for receiving a first signal from outside and transmitting the first signal;
   an actuator having a bottom electrode for receiving the first signal, a top electrode corresponding to said bottom electrode for receiving the second signal and generating an electric field between said top electrode and said bottom electrode, and an active layer formed between said top electrode and said bottom electrode and deformed by the electric field; and
   a supporting element having a supporting layer attached beneath said bottom electrode for supporting said actuator, a supporting member for supporting said actuator, said supporting member being formed between said substrate where said connecting terminal is formed and a bottom of a first portion of said supporting layer, and a secondary supporting means for preventing an initial deflection of said actuator, said secondary supporting means being formed between said substrate and a bottom of a second portion of said supporting layer, wherein said supporting member has a first rectangular cross section and said secondary supporting means has a second rectangular cross section smaller than the first rectangular cross section, so that the radio of widths of said first rectangular cross section and said second rectangular cross section is between about 8:1 and about 4:1, and the ratio of lengths of said first rectangular cross section and said second rectangular cross section is between about 2:1 and 1:1.

2. The thin film actuated mirror array as claimed in claim 1, wherein said supporting layer, said supporting member and said secondary supporting means are formed by using the same material.

3. The thin film actuated mirror array as claimed in claim 1, wherein said secondary supporting means is integrally formed with said supporting member on a lateral portion of the first portion of said supporting member.

4. The thin film actuated mirror array as claimed in claim 1, wherein the cross-sectional area of said supporting member is broader than the cross-sectional area of said secondary supporting means.

5. The thin film actuated mirror array as claimed in claim 1, wherein two secondary supporting means are integrally formed with said supporting member, said two secondary supporting means being parallely formed on a lateral portion of the first portion of said supporting member.

6. The thin film actuated mirror array as claimed in claim 1, wherein said secondary supporting means is formed apart from said supporting member.

7. The thin film actuated mirror array as claimed in claim 6, wherein the cross-sectional area of said supporting member is broader than the cross-sectional area of said secondary supporting means.

8. The thin film actuated mirror array as claimed in claim 7, wherein said supporting member has a first rectangular cross section and said secondary supporting means has a second rectangular cross section which is smaller than said first rectangular cross section.

9. The thin film actuated mirror array as claimed in claim 8, wherein the ratio of widths of the first rectangular cross section and the second rectangular cross section is between about 8:1 and about 4:1 and the ratio of lengths of the first rectangular cross section and the second rectangular cross section is between about 5:1 and about 2:1.

10. The thin film actuated mirror array as claimed in claim 1, wherein two secondary supporting means are formed apart from said supporting member, said two secondary supporting means being parallely formed each other.

11. The thin film actuated mirror array as claimed in claim 1, wherein said thin film actuated mirror array further comprises a reflecting means on said top electrode.

12. A thin film actuated mirror array comprising:

a substrate having electrical wiring and a connecting terminal for receiving a first signal from outside and transmitting the first signal;

an actuator having a bottom electrode for receiving the first signal, a top electrode corresponding to said bottom electrode for receiving a second signal and generating an electric field between said top electrode and said bottom electrode, and an active layer formed between said top electrode and said bottom electrode and deformed by the electric field; and a supporting element having a supporting layer attached beneath said bottom electrode for supporting said actuator, a supporting member for supporting said actuator, said supporting member being formed between said substrate where said connecting terminal is formed and a bottom of a first portion of said supporting layer, and a secondary supporting means formed between said substrate and a bottom of a second portion of said supporting layer for preventing an initial deflection of said actuator, said secondary supporting means being integrally formed with said supporting member, wherein said supporting member has a first rectangular cross section and said secondary supporting means has a second rectangular cross section which is smaller than said first rectangular cross section, the ratio of widths of the first rectangular cross section and the second rectangular cross section is about 8:1 and the ratio of the lengths of the first rectangular cross section and the second rectangular cross section is about 1:1.

13. A thin film actuated mirror array comprising:

a substrate having electrical wiring and a connecting terminal for receiving a first signal from outside and transmitting the first signal;

an actuator having a bottom electrode for receiving the first signal, a top electrode corresponding to said bottom electrode for receiving a second signal and generating an electric field between said top electrode and said bottom electrode, and an active layer formed between said top electrode and said bottom electrode and deformed by the electric field; and a supporting element having a supporting layer attached beneath said bottom electrode for supporting said actuator, a supporting member for supporting said actuator, said supporting member being formed between said substrate where said connecting terminal is formed and a bottom of a first portion of said supporting layer, and a secondary supporting means formed between said substrate and a bottom of a second portion of said supporting layer for preventing an initial deflection of said actuator, said secondary supporting means being formed apart from said supporting member, wherein said supporting member has a first rectangular cross section and said secondary supporting means has a second rectangular cross section which is smaller than said first rectangular cross section, the ratio of widths of the first rectangular cross section and the second rectangular cross section is between about 8:1 and about 16:3 and the ratio of the lengths of the first rectangular cross section and the second rectangular cross section is between about 10:3 and 2:1.

14. A method for manufacturing a thin film actuated mirror array comprising the steps of:

providing a substrate having electrical wiring and a connecting terminal for receiving a first signal from outside and transmitting the first signal;

forming a sacrificial layer on said substrate;

patterning said sacrificial layer as a rectangle shape so as to expose a first portion of said substrate where said connecting terminal is formed and patterning said sacrificial layer as a rectangle shape so as to expose a second portion of said substrate adjacent to the first portion, said second portion being smaller than said first portion;

forming a supporting member and a secondary supporting means on the exposed portion of said substrate, wherein said supporting member has a first rectangular cross section and said secondary supporting means has a second rectangular cross section which is smaller than said first rectangular cross section, the ratio of widths of the first rectangular cross section and the second rectangular cross section is between about 8:1 and about 16:3 and the ratio of the lengths of the first rectangular cross section and the second rectangular cross section is between about 10:3 and 2:1;

forming a first layer on said supporting member, on said secondary supporting means and on said sacrificial layer;

forming a bottom electrode layer, a second layer and a top electrode layer on said first layer;

forming an actuator by patterning said top electrode layer to form a top electrode for receiving a second signal and generating an electric field, by patterning said second layer to form an active layer deformed by the electric field, and by patterning said bottom electrode layer to form a bottom electrode for receiving the first signal, and forming a supporting layer by patterning said first layer.

15. The method for manufacturing the thin film actuated mirror array as claimed in claim 14, wherein the step of forming said supporting member and said secondary supporting means is performed concurrently with the step of forming said first layer.

16. The method for manufacturing the thin film actuated mirror array as claimed in claim 14, wherein the method for manufacturing the thin film actuated mirror array further comprises a step of forming a reflecting means on said top electrode.

* * * * *